(12) United States Patent
Takahashi

(10) Patent No.: US 11,029,586 B2
(45) Date of Patent: Jun. 8, 2021

(54) OPTICAL SYSTEM AND IMAGE PROJECTION APPARATUS

(71) Applicant: CANON KABUSHIKI KAISHA, Tokyo (JP)

(72) Inventor: Makoto Takahashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 16/135,180

(22) Filed: Sep. 19, 2018

(65) Prior Publication Data

US 2019/0094670 A1 Mar. 28, 2019

(30) Foreign Application Priority Data

Sep. 25, 2017 (JP) .............................. JP2017-184001

(51) Int. Cl.
| | |
|---|---|
| *G02B 17/00* | (2006.01) |
| *G02B 21/00* | (2006.01) |
| *G02B 23/00* | (2006.01) |
| *G03B 21/14* | (2006.01) |
| *G03B 21/20* | (2006.01) |

(Continued)

(52) U.S. Cl.
CPC .............. *G03B 21/147* (2013.01); *G02B 9/10* (2013.01); *G02B 13/18* (2013.01); *G02B 27/18* (2013.01); *G03B 21/2066* (2013.01)

(58) Field of Classification Search
CPC ........ G03B 21/10; G03B 21/14; G03B 21/28; G03B 21/142; G03B 21/147; G03B 21/2066; G02B 17/08; G02B 17/0812; G02B 17/0816; G02B 17/0828; G02B 17/0844; G02B 17/0848; G02B 17/0852; G02B 27/0025; G02B 27/14; G02B 27/18; G02B 9/10; G02B 13/06; G02B 13/16; G02B 13/18; H04N 5/74; H04N 9/3102

See application file for complete search history.

(56) References Cited

U.S. PATENT DOCUMENTS

| | | | |
|---|---|---|---|
| 2006/0227299 | A1 | 10/2006 | Hisada et al. |
| 2007/0184368 | A1 | 8/2007 | Nishikawa et al. |

(Continued)

FOREIGN PATENT DOCUMENTS

| | | | |
|---|---|---|---|
| CN | 1845001 | A | 10/2006 |
| CN | 106257318 | A | 12/2016 |

(Continued)

OTHER PUBLICATIONS

Notice of Reasons for Rejection issued by the Japanese Patent Office dated May 12, 2020 in corresponding Japanese Patent Application No. 2017184001, with English translation.

(Continued)

*Primary Examiner* — Mustak Choudhury

(74) *Attorney, Agent, or Firm* — Carter, DeLuca & Farrell LLP

(57) ABSTRACT

An optical system includes, in order from a reduction conjugate side to an enlargement conjugate side, a refractive optical unit having a positive refractive power, and a mirror optical unit that includes a mirror element having a positive refractive power and a mirror element having a negative refractive power and reforms an intermediate image formed by the refractive optical unit. A predetermined condition is satisfied.

23 Claims, 11 Drawing Sheets

(51) Int. Cl.
    *G02B 13/18*   (2006.01)
    *G02B 9/10*    (2006.01)
    *G02B 27/18*   (2006.01)

(56) References Cited

U.S. PATENT DOCUMENTS

| | | | |
|---|---|---|---|
| 2008/0068563 A1* | 3/2008 | Abe | G02B 17/08 353/98 |
| 2009/0168031 A1* | 7/2009 | Imaoka | G02B 13/16 353/99 |
| 2009/0231690 A1 | 9/2009 | Nishikawa et al. | |
| 2010/0208364 A1 | 8/2010 | Minefuji | |
| 2011/0199692 A1 | 8/2011 | Minefuji | |
| 2012/0162750 A1 | 6/2012 | Vizgaitis | |
| 2016/0370692 A1 | 12/2016 | Ode et al. | |
| 2017/0153430 A1 | 6/2017 | Iijima et al. | |
| 2019/0011816 A1 | 1/2019 | Takahashi | |

FOREIGN PATENT DOCUMENTS

| | | |
|---|---|---|
| JP | 2008250296 A | 10/2008 |
| JP | 2009157223 A | 7/2009 |
| WO | 2006043666 A1 | 4/2006 |
| WO | 2016125681 A1 | 8/2016 |
| WO | 2017014317 A1 | 1/2017 |
| WO | 2017033445 A1 | 3/2017 |

OTHER PUBLICATIONS

Notification of the First Office Action issued by the China National Intellectual Property Administration dated Feb. 24, 2021 in corresponding CN Patent Application No. 201811090536.1, with English translation.

* cited by examiner

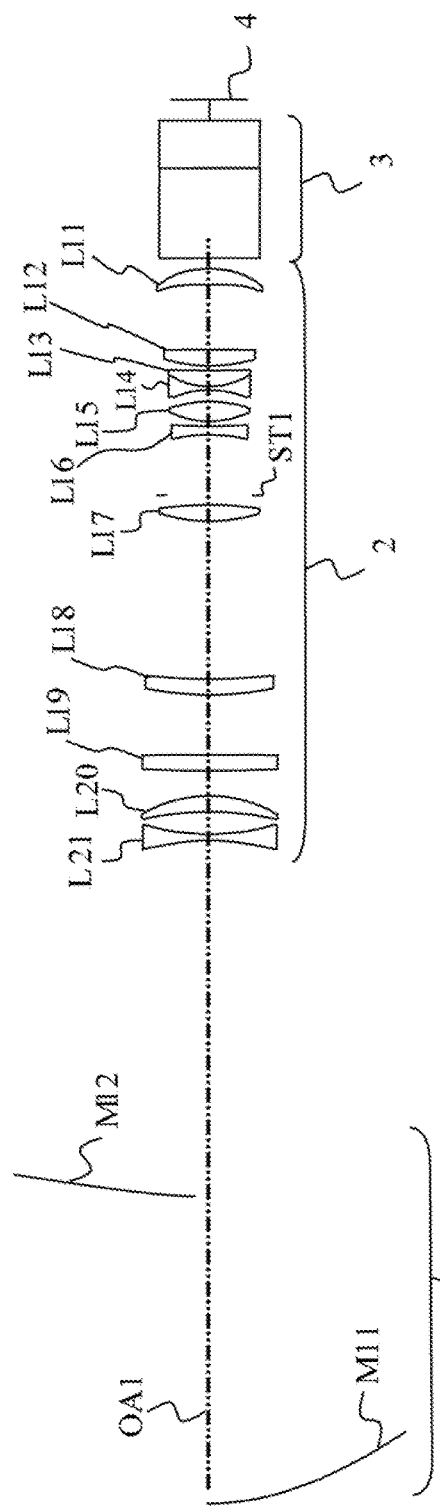
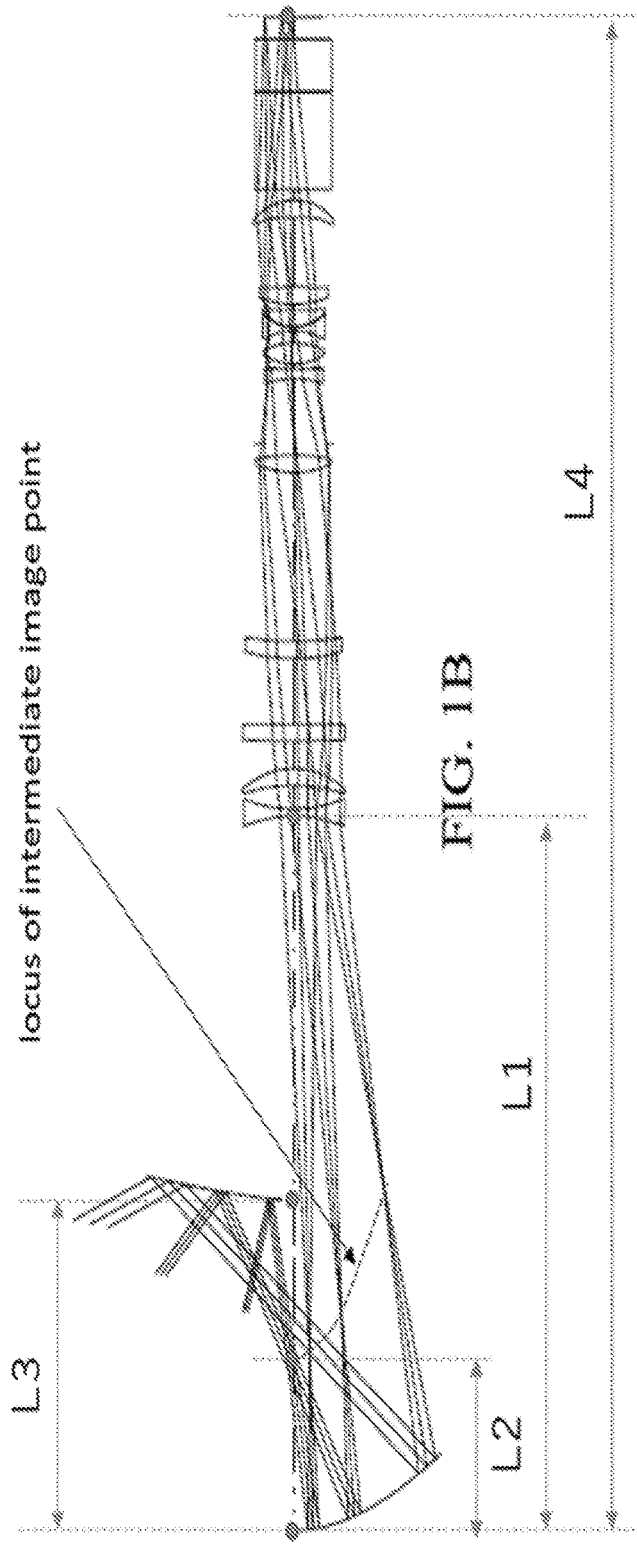
FIG. 1A
FIG. 1B

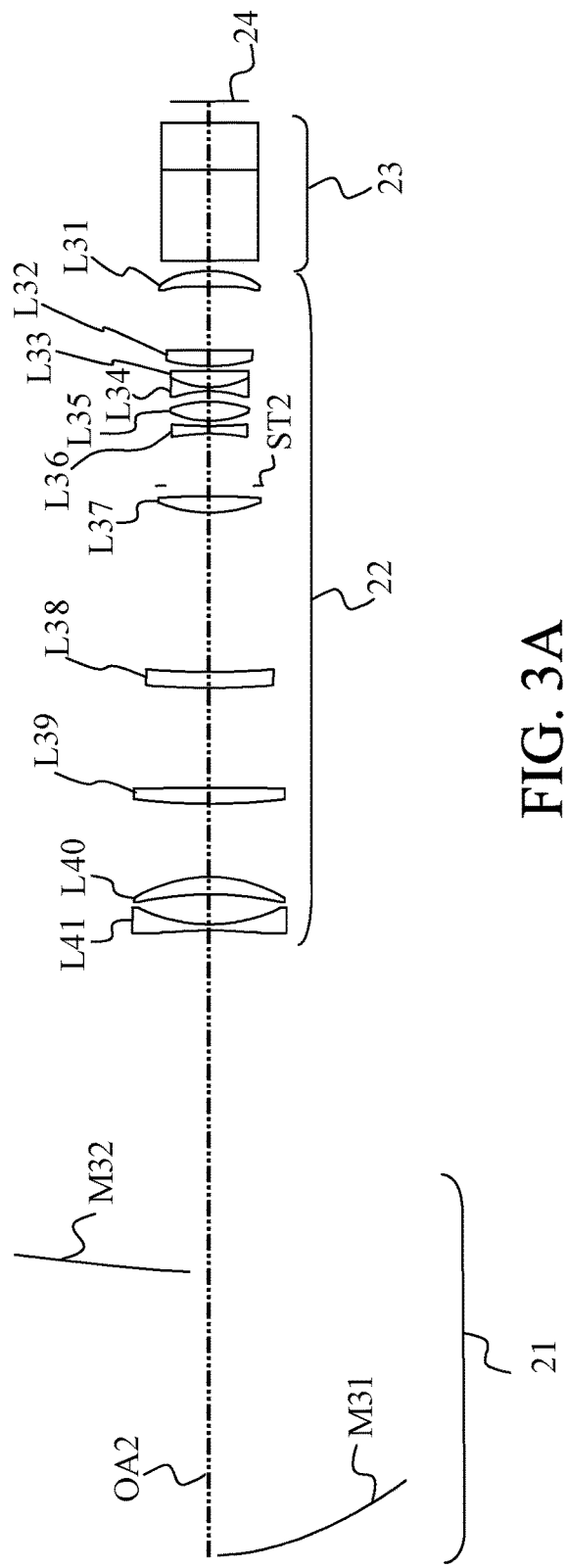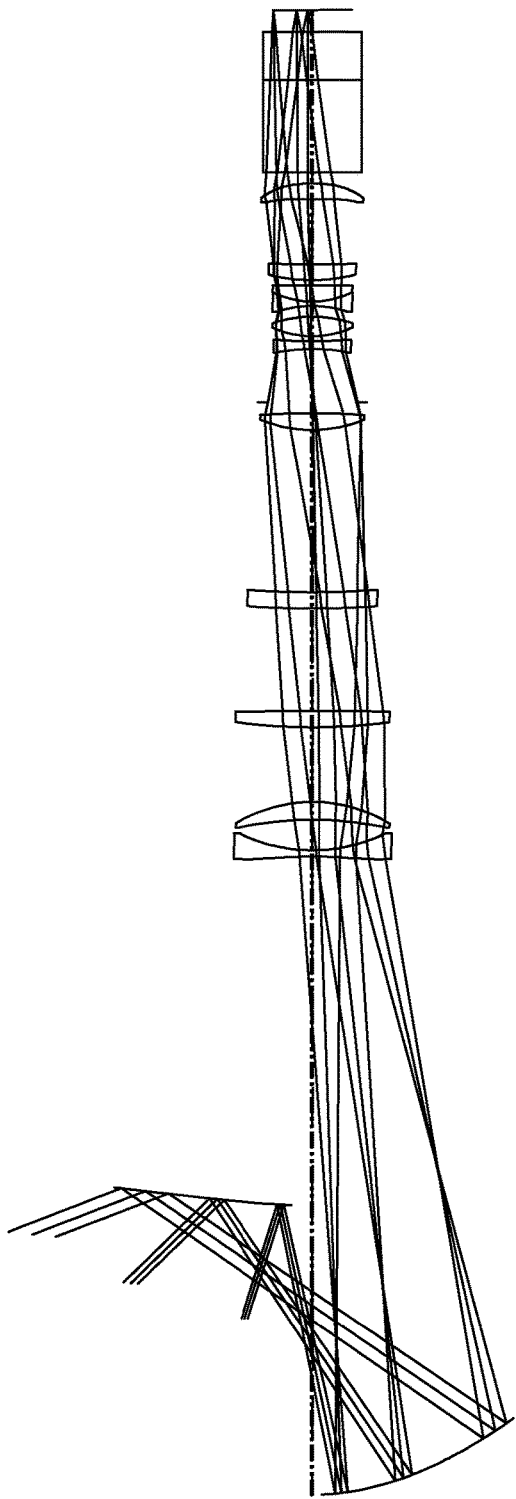
FIG. 3A
FIG. 3B

OPTICAL SYSTEM AND IMAGE PROJECTION APPARATUS

BACKGROUND OF THE INVENTION

Field of the Invention

The present invention relates to an optical system and an image projection apparatus.

Description of the Related Art

There have conventionally been proposed a variety of image projection apparatuses (projectors) configured to project an image generated by an image display element, such as liquid crystal, onto a screen surface. The projectors have recently been strongly required for a wider angle and a shorter distance projection as well as a smaller configuration and a higher definition, and a known projector provides a super wide angle by providing a projection optical system with a refractive optical element such as a lens and a reflective optical element such as a mirror.

For the smaller configuration and higher definition, Japanese Patent Laid-Open No. ("JP") 2008-250296 discloses a projection optical system that includes a concave mirror and a plurality of lenses, and optimizes a distance from a refractive surface closest to the enlargement conjugate side to a display surface of an image display element, and a distance from an optical axis to an end farthest from the optical axis on the display surface.

For the smaller configuration, JP 2009-157223 discloses a projection optical system that includes a convex mirror, a concave mirror, and a plurality of lenses, and properly sets an arrangement of mirrors and a focal length.

However, the projection optical system disclosed in JP 2008-250296 including only the concave mirror cannot sufficiently correct the aberration or cannot provide the sufficient optical performance.

In addition, due to the inappropriate power arrangement of the two mirrors and the refractive optical system, the projection optical system disclosed in JP 2009-157223 cannot sufficiently correct the aberration or cannot provide the good optical performance. The sufficient aberration correction needs to increase the number of lenses and mirrors, but this scheme impedes the miniaturization.

SUMMARY OF THE INVENTION

The present invention provides an optical system and an image projection apparatus, each of which has a small configuration and a good optical performance over the entire screen.

An optical system according to one aspect of the present invention includes, in order from a reduction conjugate side to an enlargement conjugate side, a refractive optical unit having a positive refractive power, and a mirror optical unit that includes a mirror element having a positive refractive power and a mirror element having a negative refractive power, wherein the mirror optical unit reforms an intermediate image formed by the refractive optical unit, and wherein the following conditional expressions are satisfied:

$$0.1 \leq \varphi 0/\varphi M1 \leq 2$$

$$0.23 \leq L2/L1 \leq 0.4$$

where $\varphi 0$ is the refractive power of the refractive optical unit, $\varphi M1$ is a refractive power of the mirror element having the strongest positive refractive power in the mirror optical unit, L1 is a distance on an optical axis from a surface in the refractive optical unit closest to the enlargement conjugate side to a reflective surface of the mirror element having the strongest positive refractive power in the mirror optical unit, and L2 is a distance on the optical axis from an intermediate image point of an on-axis light flux to the reflective surface of the mirror element having the strongest positive refractive power in the mirror optical unit.

Further features of the present invention will become apparent from the following description of exemplary embodiments with reference to the attached drawings.

BRIEF DESCRIPTION OF THE DRAWINGS

FIGS. 1A and 1B are explanatory views of a projection lens unit according to a first embodiment.

FIGS. 3A and 3B are explanatory views of a projection lens unit according to a second embodiment.

DESCRIPTION OF THE EMBODIMENTS

Figure 2:
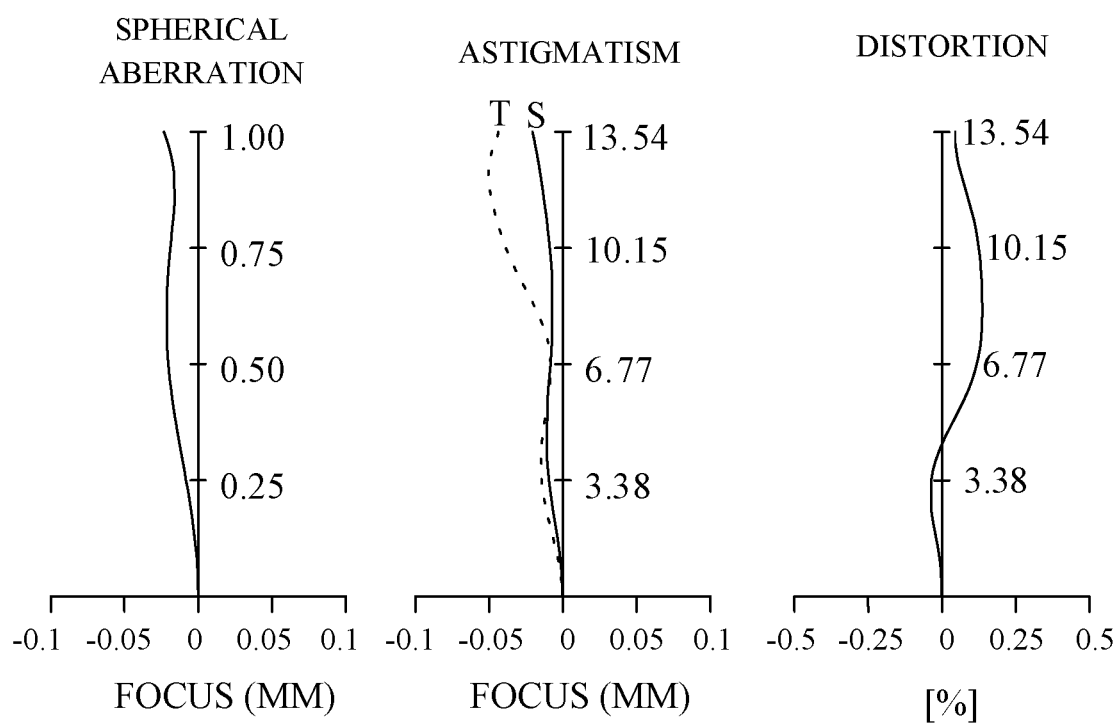
FIG. 2 illustrates aberrations where the projection lens unit according to the first embodiment has a projection distance of 814 mm.

A detailed description will now be given of embodiments according to the present invention with reference to the accompanying drawings. In each figure, the same reference numerals are given to the same elements and a duplicate description will be omitted.

An optical system according to this embodiment includes a refractive (dioptric) optical system (a refractive optical unit) having a positive refractive power and a mirror (catoptric) optical system (a mirror optical unit), and the mirror optical system includes a concave mirror having a positive refractive power and a convex mirror having a negative refractive power.

This embodiment can realize a short focus by combining the refractive optical system and the concave mirror with each other. Usually, a refractive optical system having a positive refractive power can provide a wider angle but increases the Petzval sum and thus causes a large curvature of field. On the other hand, the concave mirror has a positive refractive power but can reduce the Petzval sum of the refractive optical system having a positive refractive power, providing a good image plane performance while realizing a wider angle.

The convex mirror can cancel the negative distortion generated in the refractive optical system and the concave mirror, thus realizing a low distortion in addition to the wider angle and good image plane performance.

The optical system can be made smaller by reforming an intermediate image formed by the refractive optical system through the mirror optical system.

A smaller concave mirror and higher image quality can be realized by forming the intermediate image at a position close to the reflective surface of the concave mirror between the refractive optical system and the concave mirror.

This embodiment reduces the refractive power of the refractive optical system in comparison with the refractive power of the concave mirror. This configuration can reduce the distortion, the chromatic aberration, and the like generated in the refractive optical system, providing the good optical performance to the overall optical system.

A smaller concave mirror and high image quality can be realized by making longer a conjugate length from the image display element to the intermediate image point and by forming the intermediate image at a position close to the reflective surface of the concave mirror.

Where $\varphi 0$ is the refractive power of the refractive optical system and $\varphi M1$ is the refractive power of the mirror element having the strongest positive refractive power in the mirror optical system, the optical system according to this embodiment satisfies the following conditional expression (1).

$$0.1 \leq \varphi 0/\varphi M1 \leq 2 \quad (1)$$

Satisfying the conditional expression (1) can provide an optical system with a better optical performance. The conditional value exceeding the lower limit in the conditional expression (1) causes the concave mirror having the positive refractive power to have an excessively strong refractive power and results in a larger field curvature and larger distortion. In addition, the conditional value exceeding the upper limit in the conditional expression (1) causes the refracting optical system to have an excessively large refractive power and results in an excessively large distortion and an excessively large chromatic aberration.

A numerical range of the conditional expression (1) may be set as follows.

$$0.6 \leq \varphi 0/\varphi M1 \leq 0.95 \quad (1a)$$

The optical system according to this embodiment satisfies the following conditional expressions (2) and (3), where $\varphi fa$ is the refractive power of the overall optical system including the refractive optical system and the mirror optical system.

$$0.05 \leq |\varphi M1/\varphi fa| \leq 0.2 \quad (2)$$

$$0.01 \leq |\varphi 0/\varphi fa| \leq 0.2 \quad (3)$$

Satisfying the conditional expressions (2) and (3) can provide a smaller and wider-angle optical system with a better optical performance. The conditional value exceeding the lower limit in the conditional expression (2) causes the concave mirror to have an excessively small refractive power and has difficulties in making smaller the concave mirror. The conditional value exceeding the upper limit in the conditional expression (2) causes the concave mirror to have an excessively large refractive power and results in an excessively large field curvature and an excessively large distortion of the concave mirror. The conditional value exceeding the lower limit in the conditional expression (3) causes the refracting optical system to have an excessively small refractive power, and has difficulties in proceeding with the miniaturization. When the conditional value exceeds the upper limit in the conditional expression (3), the refractive power of the refracting optical system becomes excessively large and the distortion and chromatic aberration become excessively large. The numerical range of the conditional expression (2) may be set as follows.

$$0.09 \leq \varphi M1/\varphi fa \leq 0.15 \quad (2a)$$

Now assume that L1 is a distance on the optical axis from the surface of the refractive optical system closest to the enlargement conjugate side to the reflective surface of the mirror element having the strongest positive refractive power in the mirror optical system. In addition, assume that L2 is a distance on the optical axis from the intermediate image point of the on-axis light flux to the reflective surface of the mirror element having the strongest positive refractive power in the mirror optical system. Then, the optical system according to this embodiment satisfies the following conditional expression (4).

$$0.01 \leq L2/L1 \leq 0.4 \quad (4)$$

The conditional expression (4) defines a distance between the intermediate image and the reflective surface on the concave mirror having a positive refractive power, and satisfying the conditional expression (4) can provide an optical system with a better image plane performance. The conditional value exceeding the lower limit in the conditional expression (4) causes a scratch or dust image on the reflective surface to be projected onto the final image plane. When the conditional value exceeds the upper limit in the conditional expression (4), the light flux on the concave mirror having the positive refractive power excessively expands and prevents a smaller concave mirror and higher image quality.

Where the optical system according to this embodiment is mounted on the product using the image display element, assume that L4 is a distance on the optical axis from the display surface of the image display element to the reflective surface of the mirror element having the strongest positive refractive power in the mirror optical system and $\beta 0$ is a lateral magnification of the refractive optical system. Then, the optical system according to this embodiment satisfies the following conditional expressions (5) and (6).

$$0.01 \leq L2/L4 < 0.22 \quad (5)$$

$$1 \leq |\beta 0| \leq 7 \quad (6)$$

Satisfying the conditional expression (5) can provide the system using the image display element with a better image plane performance. The conditional value exceeding the lower limit in the conditional expression (5) causes a scratch or dust image on the reflective surface to be projected onto the final image plane. The conditional value exceeding the upper limit in the conditional expression (5) causes the light flux on the concave mirror having a positive refractive power to excessively expand and prevents the concave mirror from being made smaller and the image quality from being made higher.

The conditional expression (6) defines the lateral magnification of the refractive optical system, and properly setting the conjugate length between the image display element and the intermediate image so as to satisfy the conditional expression (6) can provide an optical system with a better optical performance. The conditional value exceeding the lower limit in the conditional expression (6) increases the numerical aperture (NA) and expands an light flux on the concave mirror having a positive refractive power, making it difficult to correct the aberration. The conditional value exceeding the upper limit in the conditional expression (6) causes the intermediate image to be large and the concave mirror having a positive refractive power to be excessively large, and prevents the optical system from being made smaller.

The numerical range of the conditional expression (6) may be set as follows.

$$3 \leq |\beta 0| \leq 6 \tag{6a}$$

The optical system according to this embodiment satisfies the following conditional expression (7) where φM2 is the refractive power of the mirror element having the strongest negative refractive power in the mirror optical system.

$$1 \leq |\varphi M1/\varphi M2| \leq 5 \tag{7}$$

The conditional expression (7) defines a ratio of the refractive power of the concave mirror having the positive refractive power to the refractive power of the convex mirror having the negative refractive power, and satisfying the conditional expression (7) can realize a smaller and wider-angle optical system with a better optical performance. When the conditional value exceeds the lower limit in the conditional expression (7), the refractive power of the convex mirror having the negative refractive power becomes excessively large and the distortion increases. The value exceeding the upper limit in the conditional expression (7) causes the concave mirror having a positive refractive power to have an excessively large refractive power and the curvature of field to be larger.

The numerical range of the conditional expression (7) may be set as follows.

$$1.3 \leq |\varphi M1/\varphi M2| \leq 2.5 \tag{7a}$$

A description will now be given of a modification of the optical system according to this embodiment. The projection system having a super wide-angle projection lens is demanded for a smaller installation space by making smaller the entire system. A variety of methods have been proposed for reducing the lens overall length or for bending the optical path for the rear surface projection, but these methods lower the optical performance and cannot realize a smaller optical system with a good optical performance. On the other hand, this embodiment can realize a smaller projection system with a better optical performance by properly bending the refractive optical system and the mirror optical system that includes a concave mirror and a convex mirror.

According to this embodiment, as described in the third to fifth embodiments, the optical system may bend the refractive optical system and the mirror optical system in a U shape and projects an image in the rear surface direction (bending or folding structure). The optical axis is bent in the bending structure when the optical axis of the optical system is set to the optical path of the on-axis principal ray vertically incident on the center of the lens surface of the refractive optical system closest to the reduction conjugate side. The optical system having the bending structure is smaller than that having no bending structure.

The principal ray of the outermost off-axis light flux intersects only once with a straight line perpendicular to the center of the lens surface of the refractive optical system closest to the reduction conjugate side. An aperture stop (diaphragm) provided near the intersection point can improve the optical performance.

Properly setting a ratio between the distance L1 and a distance L3 on the optical axis from the reflective surface of the mirror element having the strongest positive refractive power in the mirror optical system to the reflective surface of the mirror element having the strongest negative refractive power can provide the optical system with a smaller configuration and a better optical performance. The optical system may satisfy the following conditional expression (8).

$$0.01 \leq L3/L1 \leq 0.8 \tag{8}$$

Satisfying the conditional expression (8) can provide the optical system with a better image plane performance. When the conditional value exceeds the lower limit value in the conditional expression (8), the field curvature and distortion become excessively large. If the conditional value exceeds the upper limit value in the conditional expression (8), the mirror becomes large and the smaller configuration is impeded. The numerical range of the conditional expression (8) may be set as follows.

$$0.3 \leq L3/L1 \leq 0.7 \tag{8a}$$

The optical system according to this embodiment mounted on the product using the image display element satisfies the following conditional expression (9).

$$0.01 L3/L4 \leq 0.45 \tag{9}$$

Satisfying the conditional expression (9) can provide the optical system with a better image plane performance. When the conditional value exceeds the lower limit value in the conditional expression (9), the field curvature and distortion become excessively large. When the conditional value exceeds the upper limit value in the conditional expression (9), the mirror becomes larger and the smaller configuration is impeded.

Since the distance L1 can be made longer in the power arrangement of the optical system according to the modification, an optical-path bending system (an optical-path bending unit) having a plane mirror can be located between the refractive optical system and the mirror optical system and the configuration can be easily bent. For example, the third embodiment disposes each flat mirror rotated by approximately 45° relative to the optical axis. The optical-path bending system according to this embodiment includes a plane mirror as an optical-path bending element, but may include a concave mirror or a convex mirror.

The degree of freedom can be increased by decentering (shifting or tilting) the optical axis in the optical element in the refractive optical system and the mirror element relative to the optical axis.

The intermediate image point at the entire image height of the object by the refracting optical system is located at a position different from the reflective surface of the plane mirror or between the concave mirror having a positive refractive power and the plane mirror. This embodiment locates an intermediate image point between the concave mirror having a positive refractive power and the plane mirror closest to the concave mirror. This configuration can prevent a scratch or dust image at the intermediate image point from being projected onto the screen.

A prism disposed in the optical path can realize a variety of bending layouts.

The optical system according to the modification can project an image in a (back surface) direction rotated by 180° relative to the incident direction on the refractive optical system from the image display element, but the angle is not limited and the image may be projected in the direction of 90°. In other words, assume that the angle of the incident direction of the on-axis principal ray perpendicularly incident on the center of the lens surface closest to the reduction conjugate side in the refractive optical system is 0°. Then, an exit angle of the on-axis principal ray emitted from the optical axis system may be any angles between 90° and 270°.

The convex mirror included in the mirror optical system has an odd-order aspheric shape. The concave mirror may have an axially symmetrically aspheric shape or a free-form surface shape.

The refractive optical system having an aspheric lens can suppress the aberration such as the distortion. In particular, disposing an aspherical lens on the reduction conjugate side is effective in correcting the coma and provides a good optical performance.

Asymmetrically cutting an outer shape of the optical element included in the refractive or mirror optical system with respect to the horizontal or vertical direction of a plane orthogonal to the optical axis in each optical system can make smaller and lighter the optical system.

As described above, satisfying the above constitutional conditions can realize a smaller optical system with a better optical performance.

This embodiment discusses an example that applies the optical system to the image projection apparatus, but the present invention is not limited this embodiment. The optical system according to this embodiment may be used as a zoom lens that can vary a magnification (or be zoomable) by moving a plurality of lens units in a refractive optical system so that a distance between adjacent lens units varies or may be used for an imaging apparatus. Even these cases can provide the effects of this embodiment.

The lens unit, as used herein, covers a single lens or a plurality of lenses. The boundary of each lens unit is the boundary that changes an interval during zooming or focusing between lens units.

This embodiment discusses the minimum configuration necessary for the present invention, and the number and position of the mirrors are not limited to the example described in this embodiment, and a method for bending the optical path etc. may be different from that described in this embodiment.

A description will now be given of the configuration of the projection lens unit according to each embodiment. In each embodiment, a z direction is set to an optical axis direction, a y direction is set to a longitudinal direction on the paper surface, a x direction is set to a paper depth direction, and a is a rotation around the x direction as the rotational axis. In the rotation a, the counterclockwise direction with respect to the paper plane is set to the +direction.

First Embodiment

FIGS. 1A and 1B are explanatory diagrams of a projection lens unit (with a projection distance of 814 mm) according to this embodiment. FIG. 1A is a sectional view, and FIG. 1B is a ray diagram. FIG. 2 illustrates longitudinal aberrations of the projection lens unit with a projection distance of 814 mm.

The projection lens unit includes a mirror optical system 1, a refractive optical system 2, a prism unit 3 as a color separation and combination element, an image display element 4, and a stop (diaphragm) ST1. The optical system according to this embodiment includes the mirror optical system 1 and the refractive optical system 2, and the mirror optical system 1 includes a concave mirror and a convex mirror.

The mirror optical system 1 includes, in order from a reduction conjugate side, two mirror elements M11 and M12 having positive and negative refractive powers. The mirror elements M11 and M12 are aspherical mirrors. The refractive optical system 2 includes, in order from the reduction conjugate side, eleven lens elements L11 to L21 having positive, positive, positive, negative, positive, negative, positive, positive, positive, positive and negative refractive powers. The lens elements L11 and L21 are aspherical lenses.

In this embodiment, the optical path of the on-axis principal ray perpendicularly incident on the center of the lens surface in the refractive optical system 2 closest to the reduction conjugate side is set to an optical axis OA1 of the optical system. In the optical system according to this embodiment, the optical axis OA1 is not bent, and the optical axes of the lens element and the mirror element coincide with the optical axis OA1.

The optical system according to this embodiment satisfies the conditional expressions (1) to (9) (in particular, the conditional expressions (1) to (7)) and is a small optical system as a super wide-angle lens with a good optical performance. The value of each conditional expression is shown in "(C) value of each conditional expression" in numerical example 1.

Figure 11:
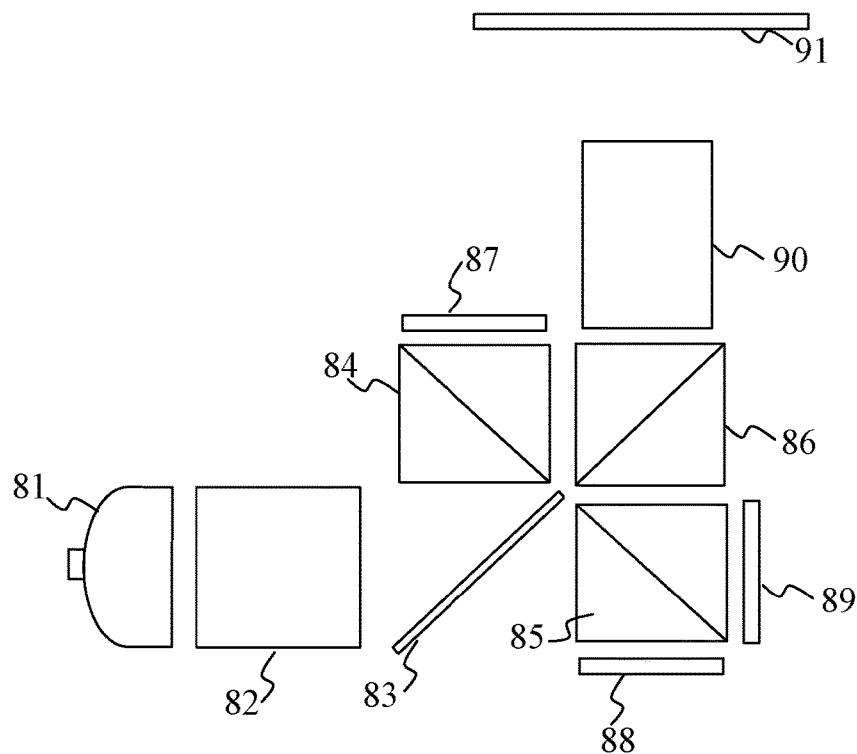
FIG. 11 is a sectional view of an image projection apparatus that includes an optical system according to the first embodiment.

FIG. 11 is a sectional view of an image projection apparatus that includes the optical system according to this embodiment. An illumination optical system 82 serves to align a polarization direction of light emitted from a light source 81 with an arbitrary direction as the P or S direction in order to illuminate the image display element as evenly as possible. A color separation optical system 83 separates the light from the illumination optical system 82 into arbitrary color light fluxes corresponding to the image display elements. Polarization beam splitters 84 and 85 transmit or reflect the incident light. Each of reflection type image display elements 87, 88, and 89 modulates the incident light in accordance with an electric signal. A color combination optical system 86 combines the light fluxes from each image display element into one. A projection optical system 90 includes the optical system according to this embodiment, and projects the light combined by the color combining optical system 86 onto a projection surface such as a screen 91.

In the image projection apparatus illustrated in FIG. 11, the illumination optical system 82, the color separation optical system 83, the polarization beam splitters 84 and 85, and the color combination optical system 86 are collectively referred to as a light guide optical system (a light guide optical unit) that guides light from the light source unit to the image display device.

Second Embodiment

Figure 4:
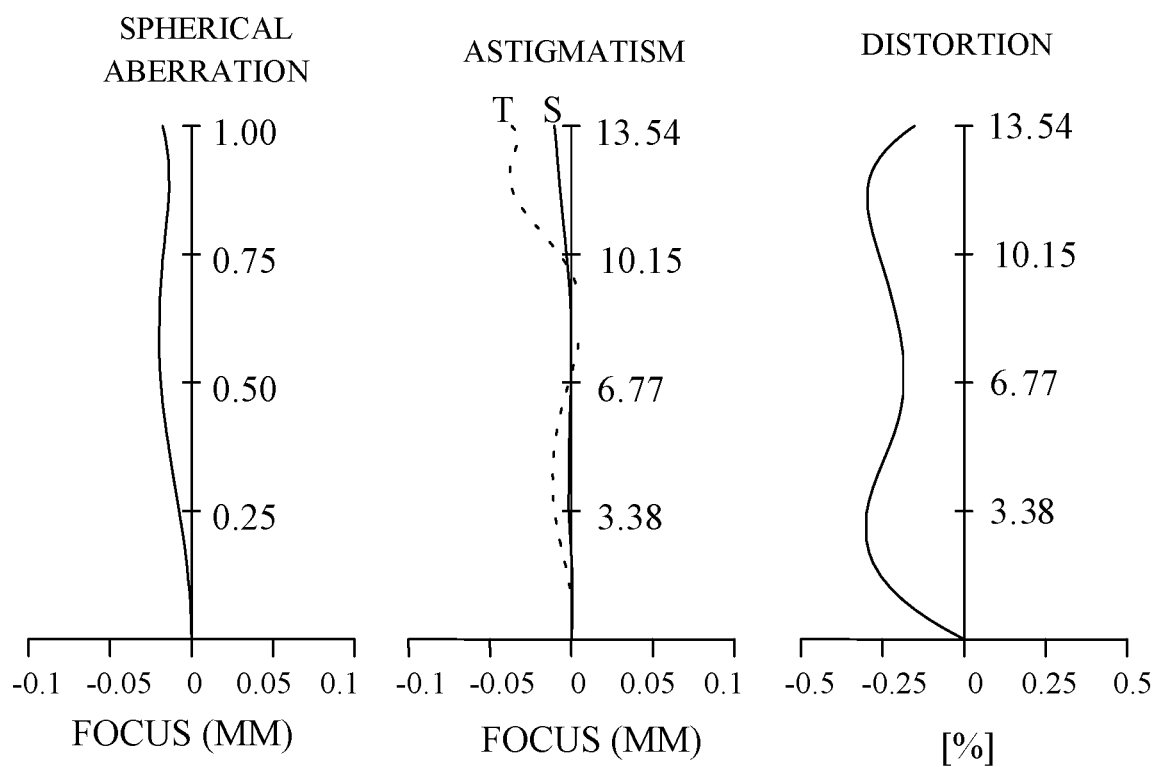
FIG. 4 illustrates aberrations where the projection lens unit according to the second embodiment has a projection distance of 814 mm.

FIGS. 3A and 3B are explanatory diagrams of a projection lens unit (with a projection distance of 814 mm) according to this embodiment. FIG. 3A is a sectional view, and FIG. 3B is a ray diagram. FIG. 4 illuminates longitudinal aberrations of the projection lens unit with the projection distance of 814 mm.

The projection lens unit includes a mirror optical system 21, a refractive optical system 22, a prism unit 23 as a color separation and combination element, an image display element 24, and a stop ST2. The optical system according to this embodiment includes a mirror optical system 21 and a refractive optical system 22, the mirror optical system 21 has a concave mirror and a convex mirror. In the optical system according to this embodiment, the refractive power ratio of the concave mirror and the convex mirror is different from that in the optical system according to the first embodiment.

The mirror optical system 21 includes, in order from the reduction conjugate side, two mirror elements M31 and M32 having positive and negative refractive powers. The mirror elements M31 and M32 are aspherical mirrors. The refractive optical system 22 includes, in order from the reduction conjugate side, eleven lens elements L31 to L41 having positive, positive, positive, negative, positive, negative, positive, positive, positive, positive, and negative refractive powers. The lens elements L31 and L41 are aspherical lenses.

In this embodiment, the optical path of the on-axis principal ray perpendicularly incident on the center of the lens surface of the refractive optical system 22 closest to the conjugate side is set to the optical axis OA2 of the optical system. In the optical system according to this embodiment, the optical axis OA2 is not bent, and the optical axes of the lens element and the mirror element coincide with the optical axis OA2.

The optical system according to this embodiment satisfies the conditional expressions (1) to (9) (in particular, the conditional expressions (1) to (7)) and is a small optical system as a super wide-angle lens with a good optical performance. The value of each conditional expression is shown in "(C) value of each conditional expression" in numerical example 2.

Third Embodiment

Figure 5A:
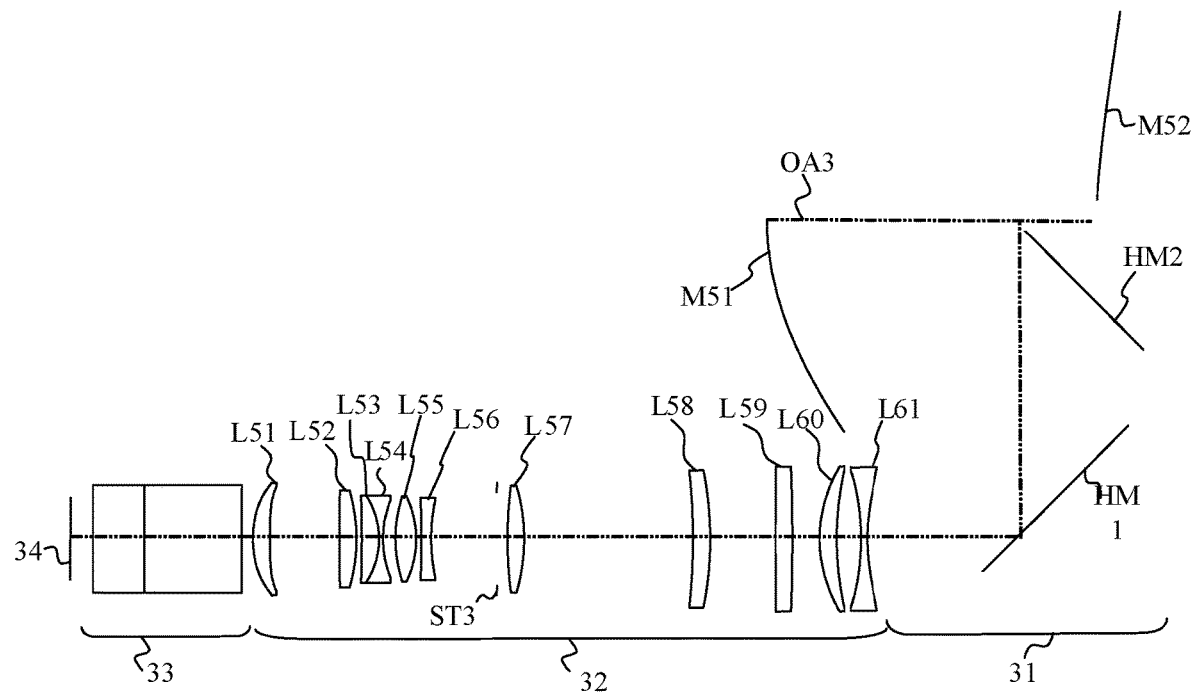
FIGS. 5A and 5B are explanatory views of a projection lens unit according to a third embodiment.
Figure 5B:
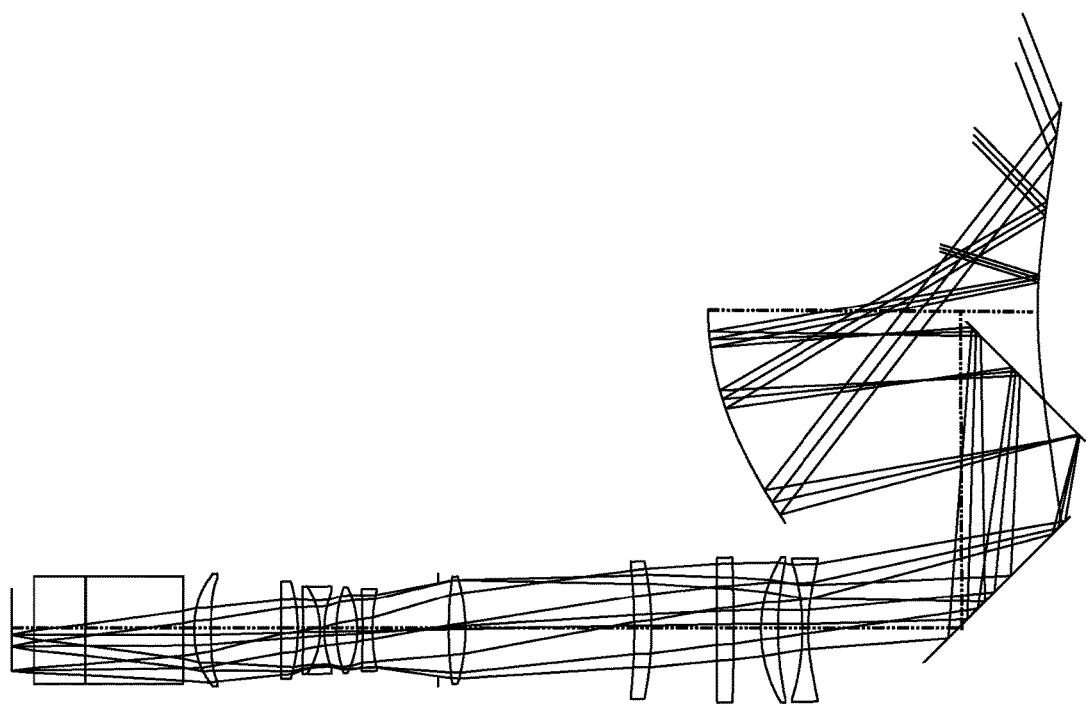
Figure 6:
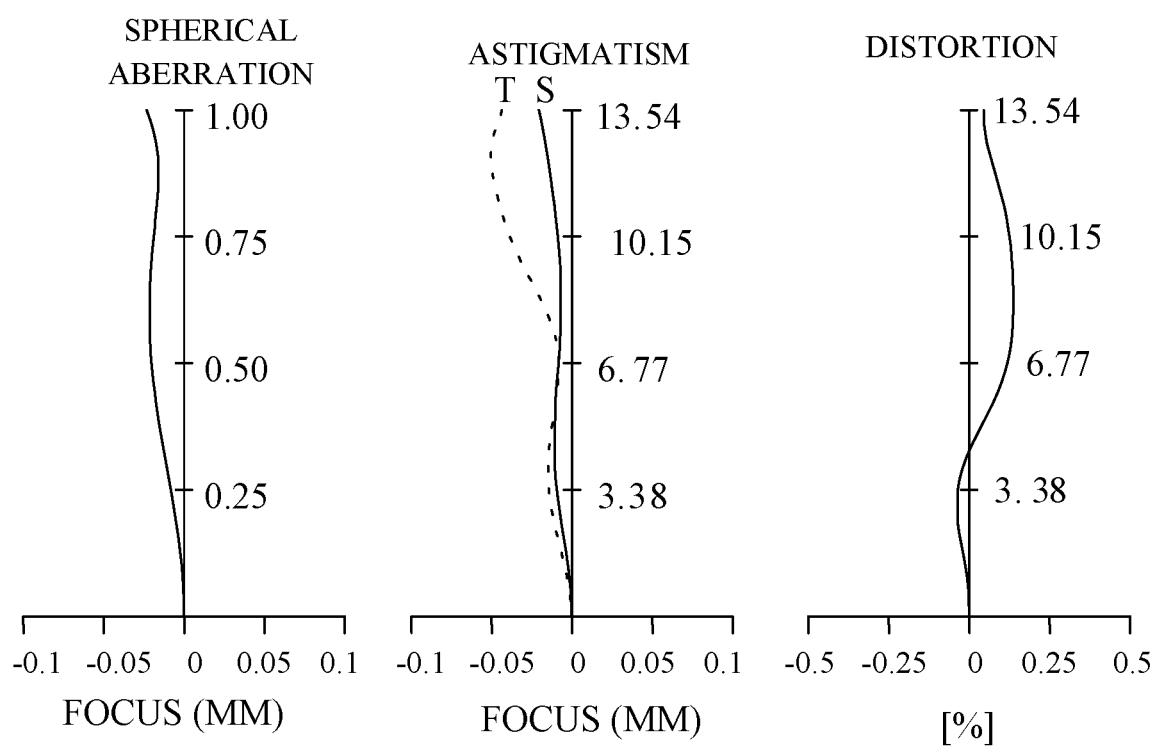
FIG. 6 illustrates aberrations where the projection lens unit according to the third embodiment has a projection distance of 814 mm.

FIGS. 5A and 5B are explanatory diagrams of a projection lens unit (with a projection distance of 814 mm) according to this embodiment. FIG. 5A is a sectional view, and FIG. 5B is a ray diagram. FIG. 6 illustrates longitudinal aberrations of the projection lens unit with a projection distance of 814 mm.

The projection lens unit includes a mirror optical system 31, a refractive optical system 32, a prism unit 33 as a color separation and combination element, an image display element 34, and a stop ST3. The optical system according to this embodiment includes a mirror optical system 31 and a refractive optical system 32, and the mirror optical system 31 includes two plane mirrors, a concave mirror, and a convex mirror. The layout of the mirror optical system in the optical system according to this embodiment is different from that of the optical systems according to the first and second embodiments. The two plane mirrors form an optical-path bending system and may be configured independently of the mirror optical system 31.

The mirror optical system 31 includes, in order from the reduction conjugate side, two plane mirrors HM1 and HM2 and two mirror elements M51 and M52 having positive and negative refractive powers. The mirror elements M51 and M52 are aspherical mirrors. The refractive optical system 32 includes, in order from the reduction conjugate side, eleven lens elements L51 to L61 having positive, positive, positive, negative, positive, negative, positive, positive, positive, positive, and negative refractive powers. The lens elements L51 and L61 are aspherical lenses.

In this embodiment, the optical path of the on-axis principal ray perpendicularly incident on the center of the lens surface in the refractive optical system 32 closest to the conjugate side is set to an optical axis OA3 of the optical system. In the optical system according to this embodiment, the two plane mirrors HM1 and HM2 incline by about 45° in the α direction with respect to the incident light. More specifically, the plane mirror HM1 has an optical axis tilted by about 45° to the optical axis OA3, and the plane mirror HM2 has an optical axis tilted by about 90° to the optical axis of the plane mirror HM1. Therefore, the optical axis OA3 is bent. The optical axes of the lens element and the mirror element coincide with the optical axis OA3. Since the optical axis OA3 is bent, the optical system according to this embodiment can emit light rotated by 180° relative to the light emitted from the image display element 34. The optical system according to this embodiment has an overall length shorter than that of an optical system having no bending structure. Therefore, the image projection apparatus that includes the optical system according to this embodiment can be smaller by the total length of the optical system than the image projection apparatus that includes the optical system that has no bending structure.

Figures 12A, 12B:
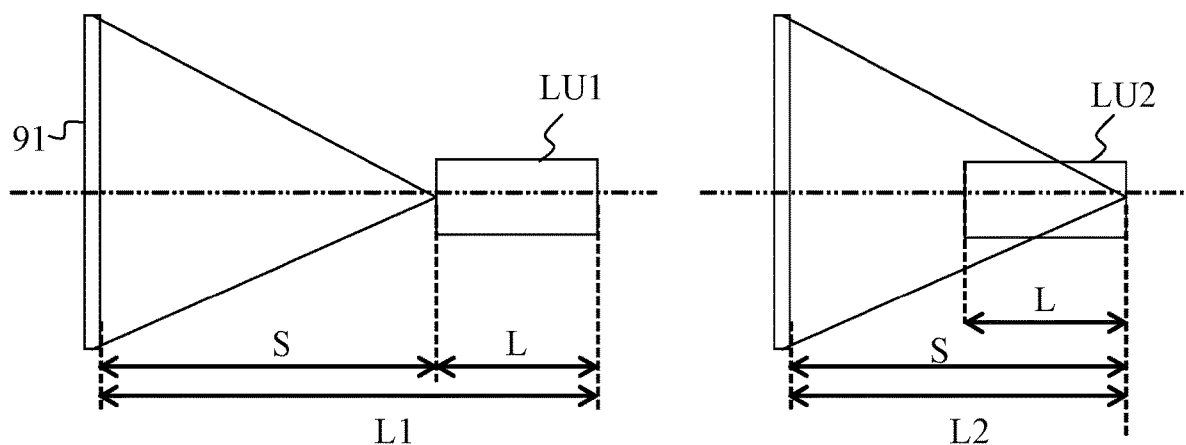
FIGS. 12A and 12B are schematic structural views of a projection system.

FIGS. 12A and 12B are schematic structural diagrams of the projection system that includes the projection lens unit and a screen 91. The projection system illustrated in FIG. 12A uses a projection lens unit LU1 having an optical system having no bending structure. The projection system in FIG. 12B uses a projection lens unit LU2 that includes the optical system according to this embodiment. Assume that S is a projection distance from the exit surface of the refractive optical system to the screen 91, and L is an overall length of the projection lens unit (the length in the z direction from the surface in the refractive optical system closest to the reduction conjugate side to the exit surface in the mirror element closest to the enlargement conjugate side). Then, an overall length L1 of the projection system becomes S+L in FIG. 12A and S in FIG. 12B. The projection system having the optical system with the bending structure can be made smaller by the overall length of the optical system than the projection system having the optical system having no bending structure.

Since the optical axis in each optical element is not decentered (shifted or tilted) from the optical axis in the projection lens unit, the projection lens unit may be comprised only by an axially symmetrical and aspherical optical element and can be easily manufactured.

The optical system according to this embodiment satisfies the conditional expressions (1) to (9) and is a small optical system as a super wide-angle lens with a good optical performance over the whole screen. The value of each conditional expression is shown in "(C) value of each conditional expression" in numerical example 3.

Fourth Embodiment

Figure 7A:
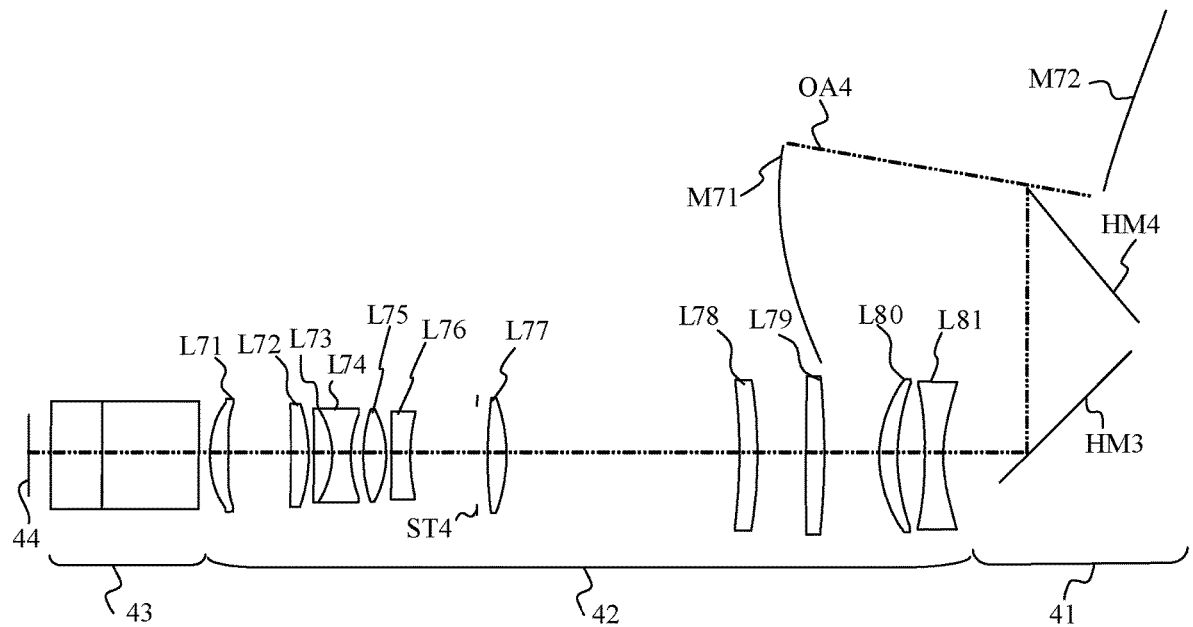
FIGS. 7A and 7B are explanatory views of a projection lens unit according to a fourth embodiment.
Figure 7B:
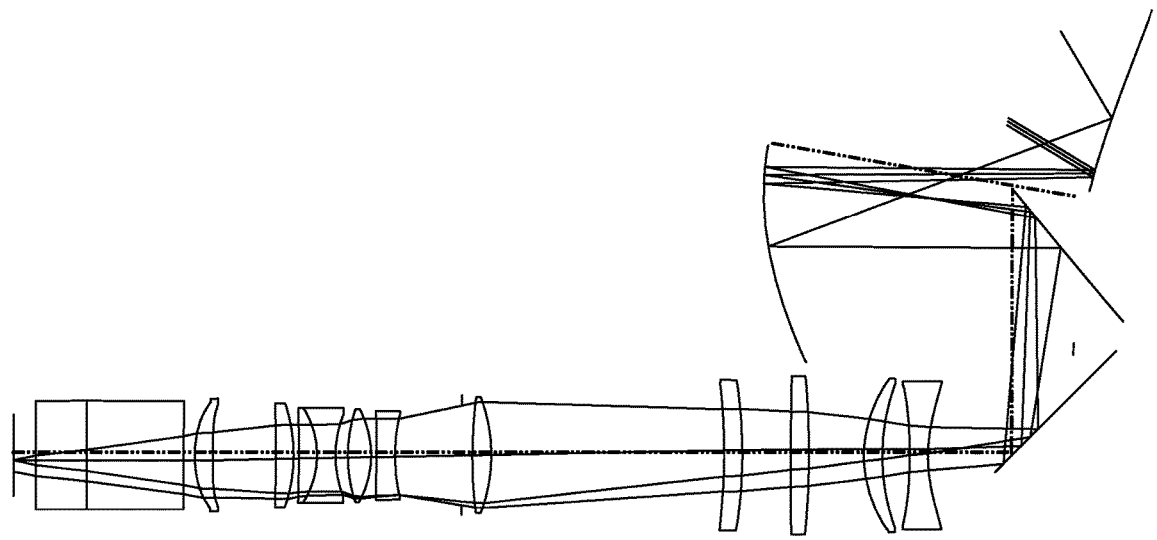
Figure 8:
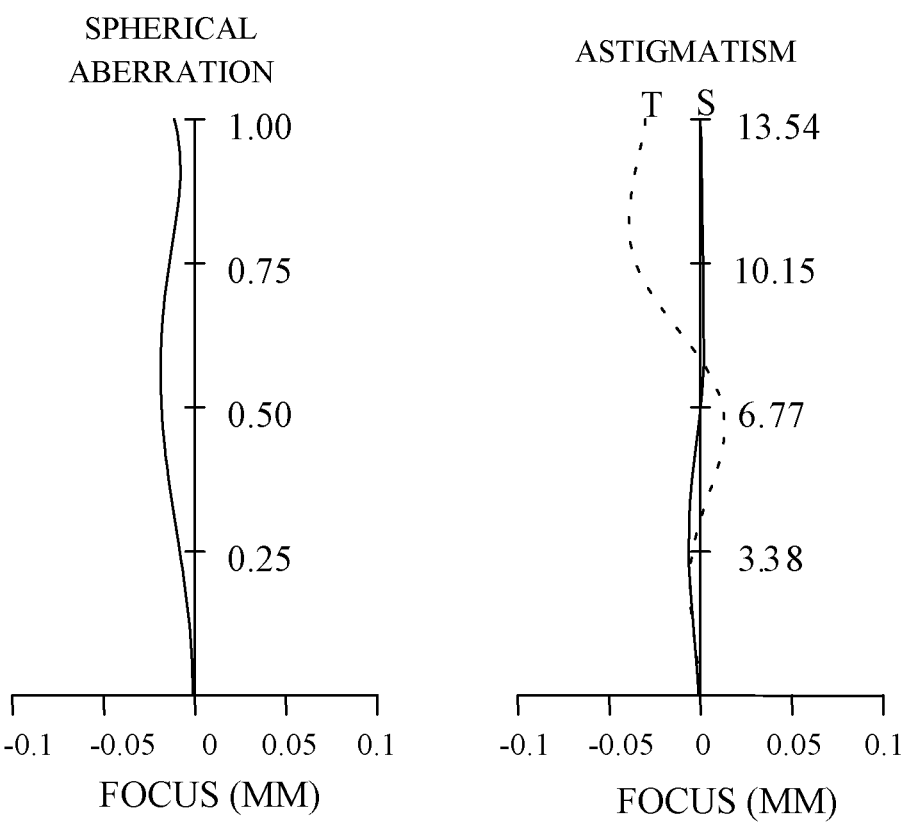
FIG. 8 illustrates aberrations where the projection lens unit according to the fourth embodiment has a projection distance of 814 mm.

FIGS. 7A and 7B are explanatory diagrams of a projection lens unit (with a projection distance of 814 mm) according to this embodiment. FIG. 7A is a sectional view, and FIG. 7B is a ray diagram. FIG. 8 illustrates longitudinal aberrations of the projection lens unit with a projection distance of 814 mm.

The projection lens unit includes a mirror optical system 41, a refractive optical system 42, a prism unit 43 as a color separation and combination element, an image display element 44, and a stop ST4. The optical system according to this embodiment includes a mirror optical system 41 and a refractive optical system 42, and the mirror optical system 41 includes two substantially flat mirrors having weak refractive power, a concave mirror, and a convex mirror. The optical system according to this embodiment is different from that according to the third embodiment in configuration of the mirror optical system. The two substantially flat mirrors form an optical-path bending system and may be configured independently of the mirror optical system 41.

The mirror optical system 41 includes, in order from the reduction conjugate side, substantially plane mirrors HM 3 and HM 4 and two mirror elements M71 and M72 having positive and negative refractive powers. The mirror elements M71 and M72 are aspherical mirrors. The refractive optical system 42 includes, in order from the reduction conjugate side, eleven lens elements L71 to L81 having positive, positive, positive, negative, positive, negative, positive, positive, positive, positive, and negative refractive powers. The lens elements L71 and L81 are aspherical lenses.

In this embodiment, the optical path of the on-axis principal ray perpendicularly incident on the center of the lens surface of the refractive optical system 42 closest to the reduction conjugate side is set to the optical axis OA4 of the optical system. In the optical system according to this embodiment, the substantially flat mirror HM4 and the mirror elements M71 and M72 incline by 50°, 1°, and 2.6° in the α direction with respect to the incident light. Therefore, the optical axis OA4 is bent. The optical axes of the lens element and the mirror element do not coincide with the optical axis OA4 but are decentered (shifted or tilted). Decentering the optical axis in each optical element from the optical axis OA4 can increase the layout freedom degree and further miniaturize the optical system. This embodiment tilts the optical axis around the x axis as a rotational center and decenters it, but may decenter it such as a shift using the z axis or the y axis as the rotation center or a shift based on the parallel movement.

The optical system according to this embodiment satisfies the conditional expressions (1) to (9) and is a small optical system as a super wide-angle lens with a good optical performance over the whole screen. The value of each conditional expression is shown in "(C) value of each conditional expression" in numerical example 4.

Fifth Embodiment

Figure 9A:
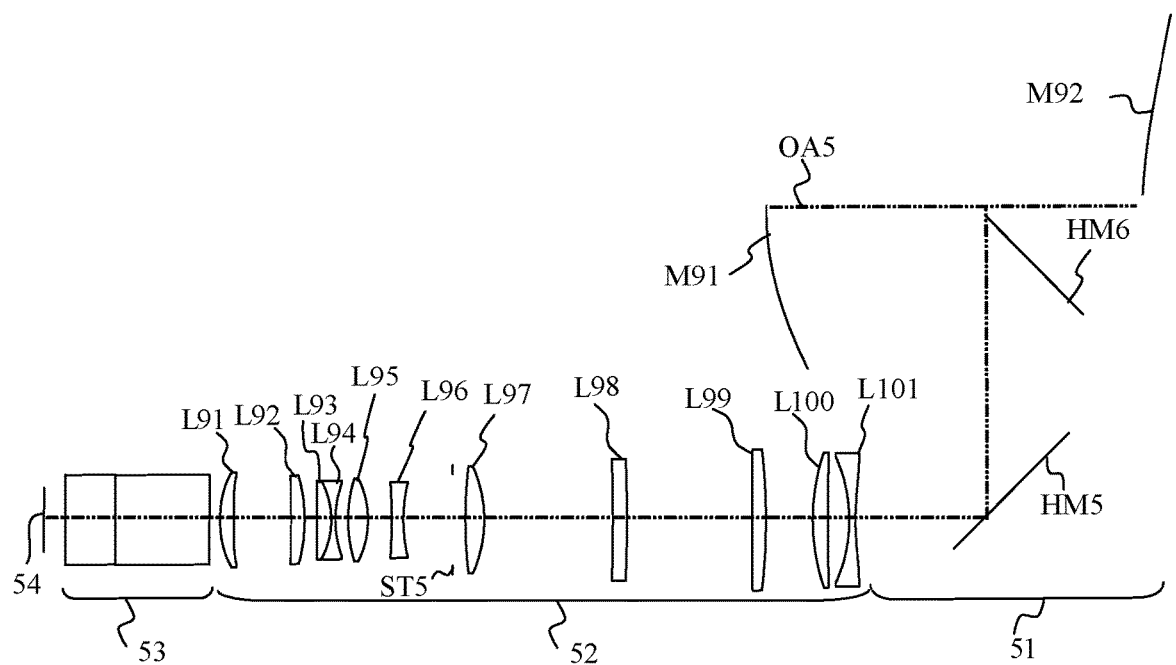
FIGS. 9A and 9B are explanatory views of a projection lens unit according to a fifth embodiment.
Figure 9B:
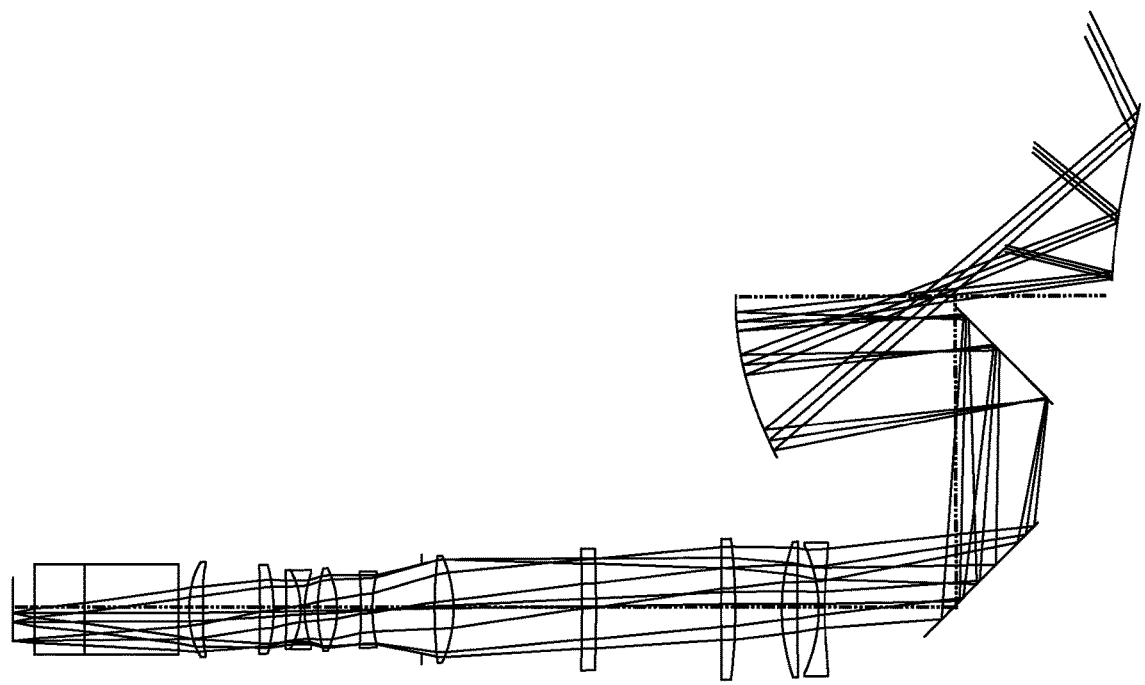
Figure 10:
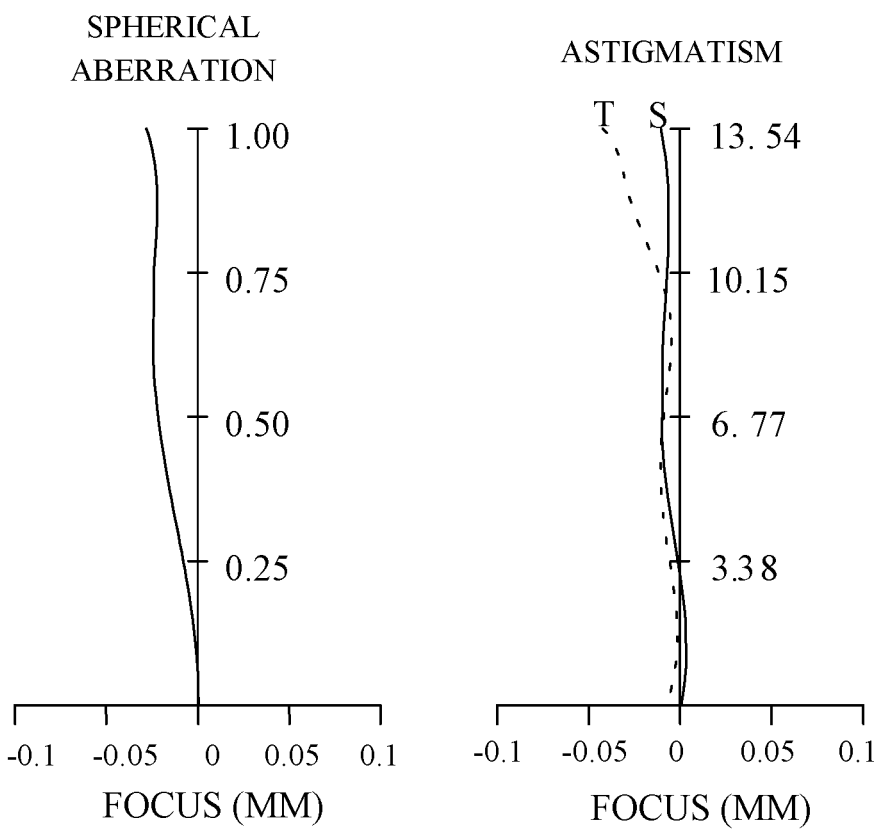
FIG. 10 illustrates aberrations where the projection lens unit according to the fifth embodiment has a projection distance of 814 mm.

FIGS. 9A and 9B are explanatory diagrams of a projection lens unit (with a projection distance of 814 mm) according to this embodiment. FIG. 9A is a sectional view, and FIG. 9B is a ray diagram. FIG. 10 illustrates longitudinal aberrations of the projection lens unit with a projection distance of 814 mm.

The projection lens unit includes a mirror optical system 51, a refractive optical system 52, a prism unit 53 as a color separation and combination element, an image display element 54, and a stop ST5. The optical system according to this embodiment includes a mirror optical system 51 and a refractive optical system 52, and the mirror optical system 51 has two plane mirrors having no refractive power, a concave mirror, and a convex mirror. The optical system according to this embodiment is different from that of the third embodiment in that the mirror optical system has a free-form surface mirror. The two plane mirrors form an optical-path bending system and may be configured independently of the mirror optical system 51.

The mirror optical system 51 includes, in order from the reduction conjugate side, two plane mirrors HM5 and HM6 and two mirror elements M91 and M92 having positive and negative refractive powers. The mirror element M91 is a free-form surface mirror, and the mirror element M92 is an aspherical mirror. The refractive optical system 52 includes, in order from the reduction conjugate side, eleven lens elements L91 to L101 having positive, positive, positive, negative, positive, negative, positive, positive, positive, positive, and negative refractive powers. The lens elements L91 and L101 are aspherical lenses.

In this embodiment, the optical path of the on-axis principal ray perpendicularly incident on the center of the lens surface of the refractive optical system 52 closest to the reduction conjugate side is set to the optical axis OA5 of the optical system. In the optical system according to this embodiment, the two plane mirrors incline by approximately 45° in the α direction with respect to the incident light. Therefore, the optical axis OA5 is bent. The optical axes of the lens element and the mirror element coincide with the optical axis OA5.

The optical system according to this embodiment can realize a better optical performance by providing a mirror element having a positive refractive power with a free-form surface shape. Using the free-form surface mirror is not limited to the lens arrangement according to this embodiment and is effective, for example, to the decentered optical system according to the fourth embodiment.

The optical system according to this embodiment satisfies the conditional expressions (1) to (9) and is a small optical system as a super wide-angle lens with a good optical performance over the entire screen. The value of each conditional expression is shown in "(C) value of the each conditional expression" in numerical example 5.

The numerical examples 1 to 5 corresponding to the first to fifth embodiments will be shown below. In "(A) lens configuration" in each numerical example, f is an focal length, F is an aperture ratio, ri is a radius of curvature of an i-th surface from the object side, di is a distance (separation) between the i-th surface and (i+1)-th surface, ni and vi are a refractive index and an Abbe number of a material of an i-th optical member from the object side to the d-line, and ST is a position of the stop.

A surface with an asterisk on the left side is an aspheric surface according to the following expression (10), and "(B) aspheric coefficients" show the coefficients. In addition, y is a coordinate in a radial direction, z is a coordinate of an optical axis direction, and k is a conic coefficient, and e-X is $10^{-X}$.

$$z(y)=(y^2/ri)/[1+\{1-(1+k)(y^2/ri^2)\}^{1/2}]Ay^2+By^3+Cy^4+Dy^5+Ey^6+Fy^7+Gy^8+Hy^9+Iy^{10}+Jy^{11}+Ly^{12}+My^{13}+Ny^{14}+Oy^{15}+Py^{16} \quad (10)$$

The surface with *2 on the left side is a free-form surface shape according to the following expression (11), and "(B2) aspheric coefficients" show the coefficients. In addition, y is a coordinate in a longitudinal direction (because the unit sectional view of each embodiment corresponds to a yz section and the paper longitudinal direction is the y direction), x is a coordinate in the lateral direction, and z is a coordinate in the optical axis direction.

$$z(xy)=X2 \cdot x2+XY \cdot xy+Y2 \cdot y2+X3 \cdot x3+X2Y \cdot x2y+XY2 \cdot xy2+ \\ Y3 \cdot y3+X4x4+X3Y \cdot x3y+X2Y2 \cdot x2y2+XY3 \cdot xy3+ \\ Y4y4+X5 \cdot x5+X4Y \cdot x4y+X3Y2x3y2+X2Y3 \cdot x2y3+ \\ XY4 \cdot xy4+Y5 \cdot y5+X6 \cdot x6+X5Y \cdot x5y+X4Y2 \cdot x4y2+ \\ X3Y3 \cdot x3y3+X2Y4 \cdot x2y4+XY5 \cdot x \ y5+Y6 \cdot y6+ \quad (11)$$

Numerical Example 1

| (A) LENS CONFIGURATION | | | | |
|---|---|---|---|---|
| | F (FOCAL LENGTH) | | −6.09 | |
| | F (APERTURE RATIO) | | 2.40 | |
| | ANGLE OF FIELD | | 68.7 | |
| | BF | | 69.2 | |
| * | r1 = 362.59 | d1 = −55.37 | | |
| | r2 = ∞ | d2 = −69.91 | | |
| * | r3 = 96.85 | d3 = 271.00 | | |
| * | r4 = −73.24 | d4 = 2.50 | n1 = 1.583 | ν1 = 59.4 |
| * | r5 = 105.10 | d5 = 9.13 | | |
| | r6 = −120.00 | d6 = 6.55 | n2 = 1.487 | ν2 = 70.2 |
| | r7 = −52.83 | d7 = 10.24 | | |
| | r8 = 634.70 | d8 = 6.50 | n3 = 1.839 | ν3 = 32.3 |
| | r9 = −1973.04 | d9 = 24.69 | | |
| | r10 = 131.03 | d10 = 6.50 | n4 = 1.850 | ν4 = 32.0 |
| | r11 = 219.92 | d11 = 64.25 | | |
| | r12 = 68.56 | d12 = 6.50 | n5 = 1.496 | ν5 = 66.8 |
| | r13 = −142.65 | d13 = 4.00 | | |
| ST | r14 = ∞ | d14 = 24.89 | | |
| | r15 = −70.08 | d15 = 3.63 | n6 = 1.877 | ν6 = 36.4 |
| | r16 = 290.78 | d16 = 2.00 | | |
| | r17 = 37.20 | d17 = 7.99 | n7 = 1.497 | ν7 = 81.5 |
| | r18 = −49.59 | d18 = 4.62 | | |
| | r19 = −39.90 | d19 = 1.50 | n8 = 1.857 | ν8 = 33.1 |
| | r20 = 30.10 | d20 = 6.50 | n9 = 1.628 | ν9 = 58.6 |
| | r21 = 424.31 | d21 = 2.00 | | |
| | r22 = 63.41 | d22 = 6.50 | n10 = 1.893 | ν10 = 20.4 |
| | r23 = −848.38 | d23 = 26.59 | | |
| * | r24 = −1067.56 | d24 = 6.50 | n11 = 1.583 | ν11 = 59.4 |
| * | r25 = −44.19 | d25 = 4.25 | | |
| | r26 = ∞ | d26 = 37.00 | n12 = 1.516 | ν12 = 64.0 |
| | r27 = ∞ | d27 = 19.50 | n13 = 1.841 | ν13 = 24.6 |
| | r28 = ∞ | d28 = 8.50 | | |

| (B) ASPHERIC COEFFICIENT | | | | | |
|---|---|---|---|---|---|
| | K | A | B | C | D |
| r1 | 0 | 1.11407E−03 | 1.72358E−07 | −4.36141E−07 | 2.64310E−09 |
| r3 | 0 | 0 | 0 | −2.77041E−07 | 0 |
| r4 | 0 | 0 | 0 | 3.13061E−06 | 0 |
| r5 | 0 | 0 | 0 | 1.63954E−06 | 0 |
| r24 | 0 | 0 | 0 | −1.22479E−05 | 0 |
| r25 | 0 | 0 | 0 | −7.10503E−06 | 0 |

| | E | F | G | H |
|---|---|---|---|---|
| r1 | 3.01797E−11 | −1.50664E−13 | −2.43902E−15 | −3.38832E−19 |
| r3 | 5.6082E−12 | 0 | −5.76048E−16 | 0 |
| r4 | −1.36370E−09 | 0 | 1.89580E−12 | 0 |
| r5 | −1.43103E−09 | 0 | 2.22485E−12 | 0 |
| r24 | −1.26972E−08 | 0 | 4.07061E−11 | 0 |
| r25 | −4.0002E−09 | 0 | −1.31081E−11 | 0 |

| | I | J | L | M |
|---|---|---|---|---|
| r1 | −2.69629E−21 | 1.20965E−21 | 1.54068E−23 | 2.43780E−26 |
| r3 | −3.90997E−19 | 0 | 6.73720E−23 | 0 |
| r4 | −9.15675E−16 | 0 | 1.98179E−26 | 0 |
| r5 | −1.29293E−15 | 0 | 0 | 0 |
| r24 | −1.59185E−13 | 0 | 2.35000E−16 | 0 |
| r25 | 9.52609E−14 | 0 | −3.85513E−16 | 0 |

| | N | O | P |
|---|---|---|---|
| r1 | −1.39806E−27 | −3.83102E−30 | 0 |
| r3 | −5.0966E−27 | 0 | 0 |
| r4 | −1.09430E−22 | 0 | 0 |
| r5 | 0 | 0 | 0 |
| r24 | 1.76957E−19 | 0 | −2.59501E−22 |
| r25 | 7.53107E−19 | 0 | −3.71658E−22 |

| (C) VALUE OF CONDITIONAL EXPRESSION | |
|---|---|
| (1) | 0.771 |
| (2) | 0.126 |

-continued

| | |
|---|---|
| (3) | 0.097 |
| (4) | 0.25 |
| (5) | 0.12 |
| (6) | 3.50 |
| (7) | 2.07 |
| (8) | 0.46 |
| (9) | 0.22 |

| REFERENCE VALUE | |
|---|---|
| L1 | 271.0 |
| L2 | 69.0 |
| L3 | 125.3 |
| L4 | 573.8 |
| φfa | −0.1643 |
| φ0 | 0.0159 |
| φM1 | 0.0207 |
| φM2 | −0.0100 |
| |β0| | 3.50 |

Numerical Example 2

| (A) LENS CONFIGURATION | | | | |
|---|---|---|---|---|
| F (FOCAL LENGTH) | | −6.10 | | |
| F (APERTURE RATIO) | | 2.40 | | |
| ANGLE OF FIELD | | 68.8 | | |
| BF | | 69.2 | | |
| * | r1 = 409.29 | d1 = −50.57 | | |
| | r2 = ∞ | d2 = −65.11 | | |
| * | r3 = 94.71 | d3 = 255.00 | | |
| * | r4 = −138.10 | d4 = 2.50 | n1 = 1.649 | v1 = 52.4 |
| * | r5 = 70.63 | d5 = 12.11 | | |
| | r6 = −135.03 | d6 = 7.06 | n2 = 1.439 | v2 = 94.7 |
| | r7 = −58.42 | d7 = 30.01 | | |
| | r8 = 229.99 | d8 = 6.50 | n3 = 1.849 | v3 = 32.0 |
| | r9 = −1973.04 | d9 = 40.85 | | |
| | r10 = 329.38 | d10 = 6.50 | n4 = 1.850 | v4 = 32.0 |
| | r11 = 361.14 | d11 = 65.01 | | |
| | r12 = 54.05 | d12 = 6.76 | n5 = 1.531 | v5 = 57.0 |
| | r13 = −243.07 | d13 = 4.09 | | |
| ST | r14 = ∞ | d14 = 21.32 | | |
| | r15 = −77.64 | d15 = 3.18 | n6 = 1.885 | v6 = 37.9 |
| | r16 = 175.10 | d16 = 2.00 | | |
| | r17 = 36.55 | d17 = 7.81 | n7 = 1.439 | v7 = 94.7 |
| | r18 = −47.16 | d18 = 4.40 | | |
| | r19 = −39.70 | d19 = 1.50 | n8 = 1.853 | v8 = 32.5 |
| | r20 = 33.05 | d20 = 6.50 | n9 = 1.621 | v9 = 59.0 |
| | r21 = 1910.01 | d21 = 2.03 | | |
| | r22 = 60.98 | d22 = 6.50 | n10 = 1.893 | v10 = 20.4 |
| | r23 = 1427.68 | d23 = 25.74 | | |
| * | r24 = 334.36 | d24 = 6.50 | n11 = 1.565 | v11 = 62.6 |
| * | r25 = −48.80 | d25 = 4.25 | | |
| | r26 = ∞ | d26 = 37.00 | n12 = 1.516 | v12 = 64.0 |
| | r27 = ∞ | d27 = 19.50 | n13 = 1.841 | v13 = 24.6 |
| | r28 = ∞ | d28 = 8.50 | | |

| (B) ASPHERIC COEFFICIENT | | | | | |
|---|---|---|---|---|---|
| | K | A | B | C | D |
| r1 | 0 | 7.33642E−04 | 2.82150E−06 | −4.19096E−07 | 2.64321E−09 |
| r3 | 0 | 0 | 0 | −2.74439E−07 | 0 |
| r4 | 0 | 0 | 0 | 3.33494E−06 | 0 |
| r5 | 0 | 0 | 0 | 1.16284E−06 | 0 |
| r24 | 0 | 0 | 0 | −1.24788E−05 | 0 |
| r25 | 0 | 0 | 0 | −7.09397E−06 | 0 |

| | E | F | G | H |
|---|---|---|---|---|
| r1 | 2.86834E−11 | −1.62285E−13 | −2.43833E−15 | 7.01885E−19 |
| r3 | 5.77956E−12 | 0 | −9.97058E−16 | 0 |
| r4 | −1.80288E−09 | 0 | 1.79442E−12 | 0 |
| r5 | −1.48971E−09 | 0 | 1.93172E−12 | 0 |

-continued

|  | | | | |
|---|---|---|---|---|
| r24 | −1.35682E−08 | 0 | 3.84487E−11 | 0 |
| r25 | −4.55208E−09 | 0 | −1.42999E−11 | 0 |

|  | I | J | L | M |
|---|---|---|---|---|
| r1 | 1.19032E−20 | 1.31361E−21 | 1.53011E−23 | 1.13026E−26 |
| r3 | −3.67520E−19 | 0 | 7.17674E−23 | 0 |
| r4 | −6.37780E−16 | 0 | 1.98179E−26 | 0 |
| r5 | −7.38968E−16 | 0 | 0 | 0 |
| r24 | −1.62644E−13 | 0 | 2.35000E−16 | 0 |
| r25 | 9.25963E−14 | 0 | −3.85513E−16 | 0 |

|  | N | O | P |
|---|---|---|---|
| r1 | −1.57045E−27 | −3.25104E−30 | 0 |
| r3 | −6.15038E−27 | 0 | 0 |
| r4 | −4.65576E−24 | 0 | 0 |
| r5 | 0 | 0 | 0 |
| r24 | 1.76957E−19 | 0 | −1.80338E−22 |
| r25 | 7.53107E−19 | 0 | −3.05828E−22 |

(C) VALUE OF CONDITIONAL EXPRESSION

| (1) | 0.878 |
|---|---|
| (2) | 0.129 |
| (3) | 0.113 |
| (4) | 0.23 |
| (5) | 0.10 |
| (6) | 3.50 |
| (7) | 2.70 |
| (8) | 0.45 |
| (9) | 0.20 |

REFERENCE VALUE

| L1 | 255.0 |
|---|---|
| L2 | 59.0 |
| L3 | 115.7 |
| L4 | 593.1 |
| φfa | −0.1640 |
| φ0 | 0.0185 |
| φM1 | 0.0211 |
| φM2 | −0.0078 |
| |β0| | 3.50 |

Numerical Example 3

(A) LENS CONFIGURATION

| F (FOCAL LENGTH) | −6.09 |
|---|---|
| F (APERTURE RATIO) | 2.40 |
| ANGLE OF FIELD | 68.7 |
| BF | 69.2 |

|  |  |  |  |  |  |
|---|---|---|---|---|---|
| * | r1 = 362.59 | d1 = −55.37 | | | |
|  | r2 = ∞ | d2 = −69.91 | | | |
| * | r3 = 96.85 | d3 = 94.54 | | | |
|  | r4 = ∞ | d4 = −120.00 | | | α = 45 |
|  | r5 = ∞ | d5 = 56.42 | | | α = 45 |
| * | r6 = −73.24 | d6 = 2.50 | n1 = 1.583 | ν1 = 59.4 | |
| * | r7 = 105.10 | d7 = 9.13 | | | |
|  | r8 = −120.00 | d8 = 6.55 | n2 = 1.487 | ν2 = 70.2 | |
|  | r9 = −52.83 | d9 = 10.24 | | | |
|  | r10 = 634.70 | d10 = 6.50 | n3 = 1.839 | ν3 = 32.3 | |
|  | r11 = −1973.04 | d11 = 24.69 | | | |
|  | r12 = 131.03 | d12 = 6.50 | n4 = 1.850 | ν4 = 32.0 | |
|  | r13 = 219.92 | d13 = 64.25 | | | |
|  | r14 = 68.56 | d14 = 6.50 | n5 = 1.496 | ν5 = 66.8 | |
|  | r15 = −142.65 | d15 = 4.00 | | | |
| ST | r16 = ∞ | d16 = 24.89 | | | |
|  | r17 = −70.08 | d17 = 3.63 | n6 = 1.877 | ν6 = 36.4 | |
|  | r18 = 290.78 | d18 = 2.00 | | | |
|  | r19 = 37.20 | d19 = 7.99 | n7 = 1.497 | ν7 = 81.5 | |
|  | r20 = −49.59 | d20 = 4.62 | | | |
|  | r21 = −39.90 | d21 = 1.50 | n8 = 1.857 | ν8 = 33.1 | |

-continued

|   | r | d | n | ν |
|---|---|---|---|---|
|   | r22 = 30.10 | d22 = 6.50 | n9 = 1.628 | ν9 = 58.6 |
|   | r23 = 424.31 | d23 = 2.00 | | |
|   | r24 = 63.41 | d24 = 6.50 | n10 = 1.893 | ν10 = 20.4 |
|   | r25 = −848.38 | d25 = 26.59 | | |
| * | r26 = −1067.56 | d26 = 6.50 | n11 = 1.583 | ν11 = 59.4 |
| * | r27 = −44.19 | d27 = 4.25 | | |
|   | r28 = ∞ | d28 = 37.00 | n12 = 1.516 | ν12 = 64.0 |
|   | r29 = ∞ | d29 = 19.50 | n13 = 1.841 | ν13 = 24.6 |
|   | r30 = ∞ | d30 = 8.50 | | |

(B) ASPHERIC COEFFICIENT

|     | K | A | B | C | D |
|-----|---|---|---|---|---|
| r1  | 0 | 1.11407E−03 | 1.72358E−07 | −4.36141E−07 | 2.64310E−09 |
| r3  | 0 | 0 | 0 | −2.77041E−07 | 0 |
| r4  | 0 | 0 | 0 | 3.13061E−06 | 0 |
| r5  | 0 | 0 | 0 | 1.63954E−06 | 0 |
| r26 | 0 | 0 | 0 | −1.22479E−05 | 0 |
| r27 | 0 | 0 | 0 | −7.10503E−06 | 0 |

|     | E | F | G | H |
|-----|---|---|---|---|
| r1  | 3.01797E−11 | −1.50664E−13 | −2.43902E−15 | −3.38832E−19 |
| r3  | 5.6082E−12 | 0 | −5.76048E−16 | 0 |
| r4  | −1.36370E−09 | 0 | 1.89580E−12 | 0 |
| r5  | −1.43103E−09 | 0 | 2.22485E−12 | 0 |
| r26 | −1.26972E−08 | 0 | 4.07061E−11 | 0 |
| r27 | −4.0002E−09 | 0 | −1.31081E−11 | 0 |

|     | I | J | L | M |
|-----|---|---|---|---|
| r1  | −2.69629E−21 | 1.20965E−21 | 1.54068E−23 | 2.43780E−26 |
| r3  | −3.90997E−19 | 0 | 6.73720E−23 | 0 |
| r4  | −9.15675E−16 | 0 | 1.98179E−26 | 0 |
| r5  | −1.29293E−15 | 0 | 0 | 0 |
| r26 | −1.59185E−13 | 0 | 2.35000E−16 | 0 |
| r27 | 9.52609E−14 | 0 | −3.85513E−16 | 0 |

|     | N | O | P |
|-----|---|---|---|
| r1  | −1.39806E−27 | −3.83102E−30 | 0 |
| r3  | −5.0966E−27 | 0 | 0 |
| r4  | −1.09430E−22 | 0 | 0 |
| r5  | 0 | 0 | 0 |
| r26 | 1.76957E−19 | 0 | −2.59501E−22 |
| r27 | 7.53107E−19 | 0 | −3.71658E−22 |

(C) VALUE OF CONDITIONAL EXPRESSION

| | |
|---|---|
| (1) | 0.771 |
| (2) | 0.126 |
| (3) | 0.097 |
| (4) | 0.24 |
| (5) | 0.11 |
| (6) | 3.70 |
| (7) | 2.07 |
| (8) | 0.46 |
| (9) | 0.22 |

REFERENCE VALUE

| | |
|---|---|
| L1 | 271.0 |
| L2 | 65.0 |
| L3 | 125.3 |
| L4 | 573.8 |
| $\varphi fa$ | −0.1643 |
| $\varphi 0$ | 0.0159 |
| $\varphi M1$ | 0.0207 |
| $\varphi M2$ | −0.0100 |
| $|\beta 0|$ | 3.70 |

Numerical Example 4

| (A) LENS CONFIGURATION | | | | |
|---|---|---|---|---|
| | F (FOCAL LENGTH) | | −6.07 | |
| | F (APERTURE RATIO) | | 2.40 | |
| | ANGLE OF FIELD | | 68.8 | |
| | BF | | 69.2 | |
| * | r1 = 303.86 | d1 = −54.77 | | α = 2.57 |
| | r2 = ∞ | d2 = −69.31 | | α = 1.00 |
| * | r3 = 96.33 | d3 = 95.36 | | |
| | r4 = 4973.04 | d4 = −100.68 | | α = 50 |
| | r5 = 76715.40 | d5 = 31.98 | | α = 45 |
| * | r6 = −57.71 | d6 = 7.00 | n1 = 1.621 ν1 = 54.9 | |
| * | r7 = 192.62 | d7 = 10.48 | | |
| | r8 = −79.29 | d8 = 7.00 | n2 = 1.487 ν2 = 70.2 | |
| | r9 = −49.03 | d9 = 21.19 | | |
| | r10 = 302.89 | d10 = 7.00 | n3 = 1.850 ν3 = 32.0 | |
| | r11 = −1973.04 | d11 = 18.43 | | |
| | r12 = 170.42 | d12 = 7.00 | n4 = 1.850 ν4 = 32.0 | |
| | r13 = 226.93 | d13 = 89.20 | | |
| | r14 = 61.28 | d14 = 7.33 | n5 = 1.497 ν5 = 81.5 | |
| | r15 = −167.52 | d15 = 4.00 | | |
| ST | r16 = ∞ | d16 = 25.61 | | |
| | r17 = −63.08 | d17 = 7.00 | n6 = 1.884 ν6 = 39.5 | |
| | r18 = 762.95 | d18 = 2.00 | | |
| | r19 = 36.68 | d19 = 8.97 | n7 = 1.497 ν7 = 81.5 | |
| | r20 = −53.91 | d20 = 4.66 | | |
| | r21 = −42.52 | d21 = 7.00 | n8 = 1.862 ν8 = 34.8 | |
| | r22 = 32.63 | d22 = 7.00 | n9 = 1.620 ν9 = 58.6 | |
| | r23 = 472.00 | d23 = 2.00 | | |
| | r24 = 60.19 | d24 = 7.00 | n10 = 1.893 ν10 = 20.4 | |
| | r25 = 534.31 | d25 = 24.01 | | |
| * | r26 = 709.28 | d26 = 7.00 | n11 = 1.541 ν11 = 64.6 | |
| * | r27 = −46.36 | d27 = 4.25 | | |
| | r28 = ∞ | d28 = 37.00 | n12 = 1.516 ν12 = 64.0 | |
| | r29 = ∞ | d29 = 19.50 | n13 = 1.841 ν13 = 24.6 | |
| | r30 = ∞ | d30 = 8.50 | | |

| (B) ASPHERIC COEFFICIENT | | | | | |
|---|---|---|---|---|---|
| | K | A | B | C | D |
| r1 | 0 | 1.15548E−03 | −6.77744E−07 | −4.32269E−07 | 2.53912E−09 |
| r3 | 0 | 0 | 0 | −2.65371E−07 | 0 |
| r4 | 0 | 0 | 0 | 3.48552E−06 | 0 |
| r5 | 0 | 0 | 0 | 1.61047E−06 | 0 |
| r26 | 0 | 0 | 0 | −1.27892E−05 | 0 |
| r27 | 0 | 0 | 0 | −7.38067E−06 | 0 |

| | E | F | G | H |
|---|---|---|---|---|
| r1 | 2.91982E−11 | −1.51927E−13 | −2.38927E−15 | 6.86086E−19 |
| r3 | 5.31305E−12 | 0 | −5.7754E−16 | 0 |
| r4 | −1.21264E−09 | 0 | 1.90736E−12 | 0 |
| r5 | −1.33342E−09 | 0 | 2.40243E−12 | 0 |
| r26 | −1.25932E−08 | 0 | 4.16382E−11 | 0 |
| r27 | −3.35214E−09 | 0 | −1.20997E−11 | 0 |

| | I | J | L | M |
|---|---|---|---|---|
| r1 | 1.00028E−20 | 1.30154E−21 | 1.49287E−23 | 5.01285E−27 |
| r3 | −3.87169E−19 | 0 | 6.64552E−23 | 0 |
| r4 | −6.45143E−16 | 0 | 1.98174E−26 | 0 |
| r5 | −1.37579E−15 | 0 | 0 | 0 |
| r26 | −1.58996E−13 | 0 | 2.35000E−16 | 0 |
| r27 | 9.67477E−14 | 0 | −3.85513E−16 | 0 |

| | N | O | P |
|---|---|---|---|
| r1 | −1.59247E−27 | −2.37347E−30 | 0 |
| r3 | −5.16972E−27 | 0 | 0 |
| r4 | −3.31028E−22 | 0 | 0 |
| r5 | 0 | 0 | 0 |
| r26 | 1.76957E−19 | 0 | −2.56065E−22 |
| r27 | 7.53107E−19 | 0 | −3.75216E−22 |

| (C) VALUE OF CONDITIONAL EXPRESSION | |
|---|---|
| (1) | 0.827 |
| (2) | 0.128 |
| (3) | 0.106 |
| (4) | 0.29 |
| (5) | 0.19 |
| (6) | 4.40 |
| (7) | 1.89 |
| (8) | 0.54 |
| (9) | 0.35 |

| REFERENCE VALUE | |
|---|---|
| L1 | 228.0 |
| L2 | 65.1 |
| L3 | 124.1 |
| L4 | 350.1 |
| φfa | −0.1648 |
| φ0 | 0.0175 |
| φM1 | 0.0212 |
| φM2 | −0.0112 |
| |β0| | 4.40 |

Numerical Example 5

| (A) LENS CONFIGURATION | | | | |
|---|---|---|---|---|
| | F (FOCAL LENGTH) | | −6.09 | |
| | F (APERTURE RATIO) | | 2.40 | |
| | ANGLE OF FIELD | | 63.8 | |
| | BF | | 69.2 | |
| * | r1 = 329.89 | d1 = −66.62 | | |
| | r2 = ∞ | d2 = −81.16 | | |
| *2 | r3 = 106.59 | d3 = 85.00 | | |
| | r4 = ∞ | d4 = −120.00 | | α = 45 |
| | r5 = ∞ | d5 = 50.00 | | α = 45 |
| * | r6 = −112.37 | d6 = 2.50 | n1 = 1.604 | ν1 = 55.0 |
| * | r7 = 62.68 | d7 = 8.38 | | |
| | r8 = −720.16 | d8 = 6.02 | n2 = 1.643 | ν2 = 57.9 |
| | r9 = −80.63 | d9 = 18.20 | | |
| | r10 = 223.36 | d10 = 5.50 | n3 = 1.850 | ν3 = 32.0 |
| | r11 = −1973.04 | d11 = 49.13 | | |
| | r12 = 541.87 | d12 = 5.50 | n4 = 1.850 | ν4 = 32.0 |
| | r13 = 647.23 | d13 = 50.69 | | |
| | r14 = 50.05 | d14 = 7.57 | n5 = 1.497 | ν5 = 81.5 |
| | r15 = −165.09 | d15 = 4.94 | | |
| ST | r16 = ∞ | d16 = 19.38 | | |
| | r17 = −59.83 | d17 = 4.48 | n6 = 1.840 | ν6 = 40.7 |
| | r18 = 200.73 | d18 = 9.29 | | |
| | r19 = 35.63 | d19 = 7.86 | n7 = 1.497 | ν7 = 81.5 |
| | r20 = −53.65 | d20 = 5.00 | | |
| | r21 = −40.73 | d21 = 1.50 | n8 = 1.849 | ν8 = 34.8 |
| | r22 = 30.68 | d22 = 5.69 | n9 = 1.617 | ν9 = 59.3 |
| | r23 = 672.01 | d23 = 4.82 | | |
| | r24 = 60.93 | d24 = 5.50 | n10 = 1.893 | ν10 = 20.4 |
| | r25 = 467.75 | d25 = 22.51 | | |
| * | r26 = 469.53 | d26 = 5.50 | n11 = 1.583 | ν11 = 59.4 |
| * | r27 = −50.48 | d27 = 4.25 | | |
| | r28 = ∞ | d28 = 37.00 | n12 = 1.516 | ν12 = 64.0 |
| | r29 = ∞ | d29 = 19.50 | n13 = 1.841 | ν13 = 24.6 |
| | r30 = ∞ | d30 = 8.50 | | |

| (B) ASPHERIC COEFFICIENT | | | | | |
|---|---|---|---|---|---|
| | K | A | B | C | D |
| r1 | 0 | 1.52393E−03 | −2.75780E−07 | −4.46856E−07 | 2.70738E−09 |
| r4 | 0 | 0 | 0 | 3.81624E−06 | 0 |
| r5 | 0 | 0 | 0 | 1.18874E−06 | 0 |
| r26 | 0 | 0 | 0 | −1.18774E−05 | 0 |
| r27 | 0 | 0 | 0 | −6.88923E−06 | 0 |

-continued

|  | E | F | G | H |
|---|---|---|---|---|
| r1 | 3.00023E−11 | −1.71847E−13 | −2.41194E−15 | 1.14984E−18 |
| r4 | −1.68084E−09 | 0 | 1.86628E−12 | 0 |
| r5 | −1.55638E−09 | 0 | 1.96662E−12 | 0 |
| r26 | −1.25893E−08 | 0 | 3.43888E−11 | 0 |
| r27 | −5.49257E−09 | 0 | −1.31794E−11 | 0 |

|  | I | J | L | M |
|---|---|---|---|---|
| r1 | 1.03630E−20 | 1.54620E−21 | 1.48095E−23 | −3.14605E−26 |
| r4 | −7.10492E−16 | 0 | 1.98179E−26 | 0 |
| r5 | −8.07302E−16 | 0 | 0 | 0 |
| r26 | −1.57289E−13 | 0 | 2.35000E−16 | 0 |
| r27 | 8.62079E−14 | 0 | −3.85513E−16 | 0 |

|  | N | O | P |
|---|---|---|---|
| r1 | −1.94950E−27 | 3.54108E−30 | 0 |
| r4 | −7.97824E−23 | 0 | 0 |
| r5 | 0 | 0 | 0 |
| r26 | 1.76957E−19 | 0 | 1.92217E−22 |
| r27 | 7.53107E−19 | 0 | 6.20073E−23 |

(B2) ASPHERIC COEFFICIENT 2

|  | X2 | XY | Y2 | X3 |
|---|---|---|---|---|
| r3 | 1.21213E−05 | 2.06062E−06 | 2.57608E−05 | 8.10800E−09 |

|  | X2Y | XY2 | Y3 | X4 |
|---|---|---|---|---|
| r3 | 1.84175E−06 | 2.00721E−07 | 1.01151E−06 | 1.22318E−08 |

|  | X3Y | X2Y2 | XY3 | Y4 |
|---|---|---|---|---|
| r3 | 2.72718E−09 | −3.85082E−07 | 7.62947E−09 | −2.06374E−07 |

|  | X5 | X4Y | X3Y2 | X2Y3 |
|---|---|---|---|---|
| r3 | 8.37415E−10 | 3.31174E−08 | 1.05072E−10 | −6.89246E−10 |

|  | XY4 | Y5 | X6 | X5Y |
|---|---|---|---|---|
| r3 | 1.25381E−10 | −6.29097E−10 | −8.42379E−09 | 1.78479E−11 |

|  | X4Y2 | X3Y3 | X2Y4 | XY5 | Y6 |
|---|---|---|---|---|---|
| r3 | 5.83336E−10 | 1.03197E−12 | −1.95534E−11 | 7.4774E−13 | −7.37201E−12 |

(C) VALUE OF CONDITIONAL EXPRESSION

| (1) | 0.786 |
|---|---|
| (2) | 0.114 |
| (3) | 0.090 |
| (4) | 0.27 |
| (5) | 0.12 |
| (6) | 4.20 |
| (7) | 1.54 |
| (8) | 0.58 |
| (9) | 0.26 |

REFERENCE VALUE

| L1 | 255.0 |
|---|---|
| L2 | 70.0 |
| L3 | 147.8 |
| L4 | 574.2 |
| $\varphi fa$ | −0.1641 |
| $\varphi 0$ | 0.0147 |
| $\varphi M1$ | 0.0188 |
| $\varphi M2$ | −0.0122 |
| $|\beta 0|$ | 4.20 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-184001, filed on Sep. 25, 2017, which is hereby incorporated by reference herein in its entirety.

What is claimed is:

1. An optical system comprising;
    in order from a reduction conjugate side to an enlargement conjugate side, a refractive optical unit having a positive refractive power, and
    a mirror optical unit that includes a mirror element having a positive refractive power and a mirror element having a negative refractive power,
    wherein the mirror optical unit forms an image of an intermediate image formed by the refractive optical unit, and
    wherein the following conditional expressions are satisfied:

$0.6 \leq \varphi 0/\varphi M1 \leq 0.95$, $0.23 \leq L2/L1 \leq 0.4$, and $0.09 \leq |\varphi 0/\varphi fa| \leq 0.2$, where $\varphi 0$ is the refractive power of the refractive optical unit, $\varphi M1$ is a refractive power of the mirror element having the strongest positive refractive power in the mirror optical unit, L1 is a distance on an optical axis from a surface in the refractive optical unit closest to the enlargement conjugate side to a reflective surface of the mirror element having the strongest positive refractive power in the mirror optical unit, L2 is a distance on the optical axis from an intermediate image point of an on-axis light flux to the reflective surface of the mirror element having the strongest positive refractive power in the mirror optical unit, and $\varphi fa$ is a refractive power of an overall optical system.

2. The optical system according to claim 1, wherein the following conditional expression is satisfied:

$0.05 \leq |\varphi M1/\varphi fa| \leq 0.2$ where $\varphi fa$ is a refractive power of an overall optical system.

3. The optical system according to claim 1, wherein the following conditional expression is satisfied:

$0.01 \leq L2/L4 \leq 0.22$ where L4 is a distance on the optical axis from a display surface of an image display element to the reflective surface of the mirror element having the strongest positive refractive power in the mirror optical unit.

4. The optical system according to claim 1, wherein the following conditional expression is satisfied:

$1 \leq |\beta 0| \leq 7$ where $\beta 0$ is a lateral magnification of the refractive optical unit.

5. The optical system according to claim 1, wherein the following conditional expression is satisfied:

$1 \leq |\varphi M1/\varphi M2| \leq 5$ where $\varphi M2$ is a refractive power of a mirror element having the strongest negative refractive power in the mirror optical unit.

6. The optical system according to claim 1, further comprising an optical-path bending unit between the refractive optical unit and the mirror optical unit.

7. The optical system according to claim 6, wherein an optical path of an on-axis principal ray perpendicularly incident on a center of a lens surface of the refractive optical unit closest to the reduction conjugate side is bent.

8. The optical system according to claim 7, wherein a principal ray of an outermost off-axis light flux intersects only once with a straight line perpendicular to the center of the lens surface of the refractive optical unit closest to the reduction conjugate side.

9. The optical system according to claim 7, wherein the optical-path bending unit includes a plane mirror that inclines to the optical path.

10. The optical system according to claim 9, wherein the optical-path bending unit includes a first plane mirror having an optical axis tilted by 45° to the optical path, a second plane mirror having an optical axis tilted by 90° to the optical axis of the first plane mirror.

11. The optical system according to claim 9, wherein the intermediate image point at an entire image height of an object by the refractive optical unit is located at a position different from a position of a reflective surface of the plane mirror included in the optical-path bending unit.

12. The optical system according to claim 11, wherein the intermediate image point is located between the mirror element having the positive refractive power and the plane mirror included in the optical-path bending unit.

13. The optical system according to claim 12, wherein the intermediate image point is located between the mirror element having the positive refractive power and a plane mirror closest to the mirror element.

14. The optical system according to claim 7, wherein the optical-path bending unit includes a prism.

15. The optical system according to claim 7, wherein an exit angle of an on-axis principal ray emitted from the optical system is between 90° and 270° where an angle of an incident direction of the on-axis principal ray perpendicularly incident on the center of the lens surface of the refractive optical unit closest to the reduction conjugate side is 0°.

16. The optical system according to claim 1, wherein the following conditional expression is satisfied:

$0.01 \leq L3/L1 \leq 0.8$ where L3 is a distance on the optical axis from the reflective surface of the mirror element having the strongest positive refractive power in the mirror optical unit to the reflective surface of the mirror element having the strongest negative refractive power in the mirror optical unit, and L4 is a distance on the optical axis from a display surface of an image display element to the reflective surface of the mirror element having the strongest positive refractive power in the mirror optical unit.

17. The optical system according to claim 1, wherein the following conditional expression is satisfied:

$0.01 \leq L3/L4 \leq 0.45$ where L3 is a distance on the optical axis from the reflective surface of the mirror element having the strongest positive refractive power in the mirror optical unit to the reflective surface of the mirror element having the strongest negative refractive power in the mirror optical unit, and L4 is a distance on the optical axis from a display surface of an image display element to the reflective surface of the mirror element having the strongest positive refractive power in the mirror optical unit.

18. The optical system according to claim 1, wherein an optical axis of at least one optical element included in the refractive optical unit and the mirror optical unit is different from an optical axis of the refractive optical unit or the mirror optical unit.

19. The optical system according to claim 1, wherein the mirror element having the negative refractive power included in the mirror optical unit has an odd-order aspheric shape.

20. The optical system according to claim 1, wherein the refractive optical unit includes an aspheric lens having a positive refractive power closest to the reduction conjugate side.

21. The optical system according to claim 1, wherein an outer shape of an optical element included in the refractive optical unit is asymmetric with respect to one of a horizontal direction and a vertical direction of a plane orthogonal to an optical axis in the refractive optical unit.

22. The optical system according to claim 1, wherein the refractive optical unit includes a plurality of lens units, at least part of which moves so as to change a distance between adjacent lens units in zooming.

23. An image projection apparatus comprising;
an optical system;
an image display element; and
a light guide optical system configured to guide light from the image display element to the optical system,
wherein the optical system includes, in order from a reduction conjugate side to an enlargement conjugate side, a refractive optical unit having a positive refractive power, and a mirror optical unit that includes a mirror element having a positive refractive power and a mirror element having a negative refractive power,
wherein the mirror optical unit forms an image of intermediate image formed by the refractive optical unit, and
wherein the following conditional expressions are satisfied:

$0.6 \leq \varphi 0/\varphi M1 \leq 0.95$, $0.23 \leq L2/L1 \leq 0.4$, and $0.09 \leq |\varphi 0/\varphi fa| \leq 0.2$, where $\varphi 0$ is the refractive power of the refractive optical unit, $\varphi M1$ is a refractive power of the mirror element having the strongest positive refractive power in the mirror optical unit, L1 is a distance on an optical axis from a surface in the refractive optical unit closest to the enlargement conjugate side to a reflective surface of the mirror element having the strongest positive refractive power in the mirror optical unit, L2 is a distance on the optical axis from an intermediate image point of an on-axis light flux to the reflective surface of the mirror element having the strongest positive refractive power in the mirror optical unit, and $\varphi fa$ is a refractive power of an overall optical system.

\* \* \* \* \*